US007952979B2

(12) United States Patent
Yamasaki et al.

(10) Patent No.: US 7,952,979 B2
(45) Date of Patent: May 31, 2011

(54) COUPLING LENS, OPTICAL HEAD AND OPTICAL DISC DEVICE

(75) Inventors: Fumitomo Yamasaki, Nara (JP); Sadao Mizuno, Osaka (JP); Katsuhiko Hayashi, Osaka (JP); Hideki Aikoh, Osaka (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 12/305,784

(22) PCT Filed: Jun. 15, 2007

(86) PCT No.: PCT/JP2007/062124
§ 371 (c)(1),
(2), (4) Date: Dec. 19, 2008

(87) PCT Pub. No.: WO2007/148625
PCT Pub. Date: Dec. 27, 2007

(65) Prior Publication Data
US 2010/0002560 A1     Jan. 7, 2010

(30) Foreign Application Priority Data
Jun. 20, 2006    (JP) .................................. 2006-170013

(51) Int. Cl.
G11B 7/135     (2006.01)
(52) U.S. Cl. .................................. 369/112.23
(58) Field of Classification Search ............. 369/112.01, 369/112.03, 112.04, 112.05, 112.06, 112.07, 369/112.08, 112.23, 112.4, 112.15
See application file for complete search history.

(56) References Cited

U.S. PATENT DOCUMENTS
6,570,827 B1    5/2003   Yamamoto et al.
(Continued)

FOREIGN PATENT DOCUMENTS
JP    2000-019388    1/2000
(Continued)

OTHER PUBLICATIONS
International Search Report for corresponding Application No. PCT/JP2007/062124 mailed Jun. 19, 2007.

*Primary Examiner* — Joseph Haley
*Assistant Examiner* — Nicholas Lee
(74) *Attorney, Agent, or Firm* — Renner, Otto, Boisselle & Sklar, LLP

(57) ABSTRACT

Provides a coupling lens which, when used in combination with an objective lens for a plurality of types of optical discs such as a high density disc, DVD, CD or the like, is capable of compensating for various types of aberrations including those caused by wavelength changes and thus providing good recording or reproduction characteristics with a good wavelength dispersion compensation ability; and an optical head and an optical disc apparatus (drive).

A coupling lens is incorporated into an optical head for collecting laser light emitted from a plurality of light sources and having different wavelengths on an information recording face of different types of optical information recording mediums respectively. The coupling lens comprises a first lens and a second lens which are substantially in close contact with each other such that optical axes thereof match each other and designed such that the laser light having different wavelengths are refracted by the close contact face. The coupling lens is afocal for the shortest wavelength among the different wavelengths of the laser light.

24 Claims, 20 Drawing Sheets

U.S. PATENT DOCUMENTS

| | | |
|---|---|---|
| 7,120,109 B1 | 10/2006 | Kim et al. |
| 7,227,704 B2 * | 6/2007 | Koike ............................ 359/719 |
| 2002/0057642 A1 * | 5/2002 | Kim et al. ................. 369/112.24 |
| 2003/0185134 A1 | 10/2003 | Kimura et al. |
| 2005/0157623 A1 * | 7/2005 | Itonaga ..................... 369/112.05 |
| 2005/0275955 A1 * | 12/2005 | Sekine ........................... 359/719 |
| 2005/0280907 A1 | 12/2005 | Hayashi et al. |

FOREIGN PATENT DOCUMENTS

| | | |
|---|---|---|
| JP | 2001-176109 | 6/2001 |
| JP | 2002-100065 | 4/2002 |
| JP | 2004-079146 | 3/2004 |
| JP | 2005-285249 | 10/2005 |
| JP | 2005-322281 | 11/2005 |
| WO | 2004/053557 | 6/2004 |

* cited by examiner (a)　　　　　　　　　(b)

FIG.17
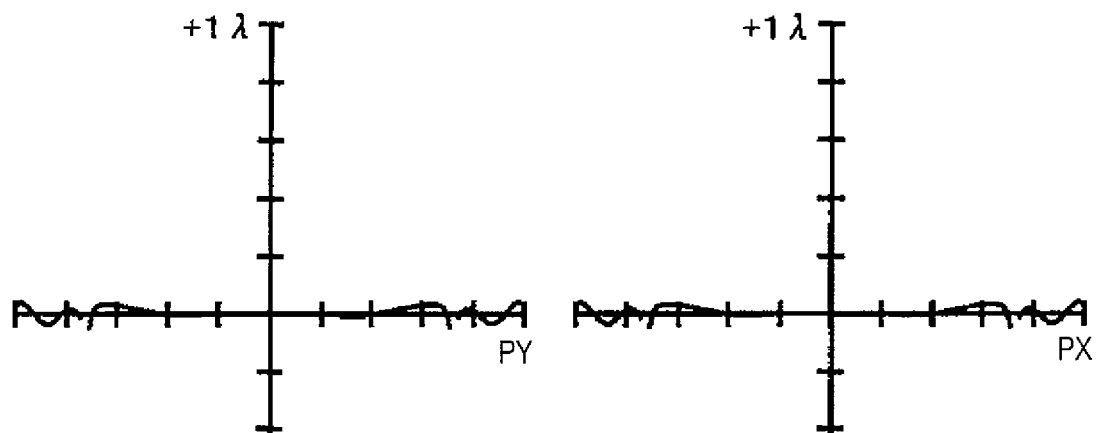
(a) 0.0deg
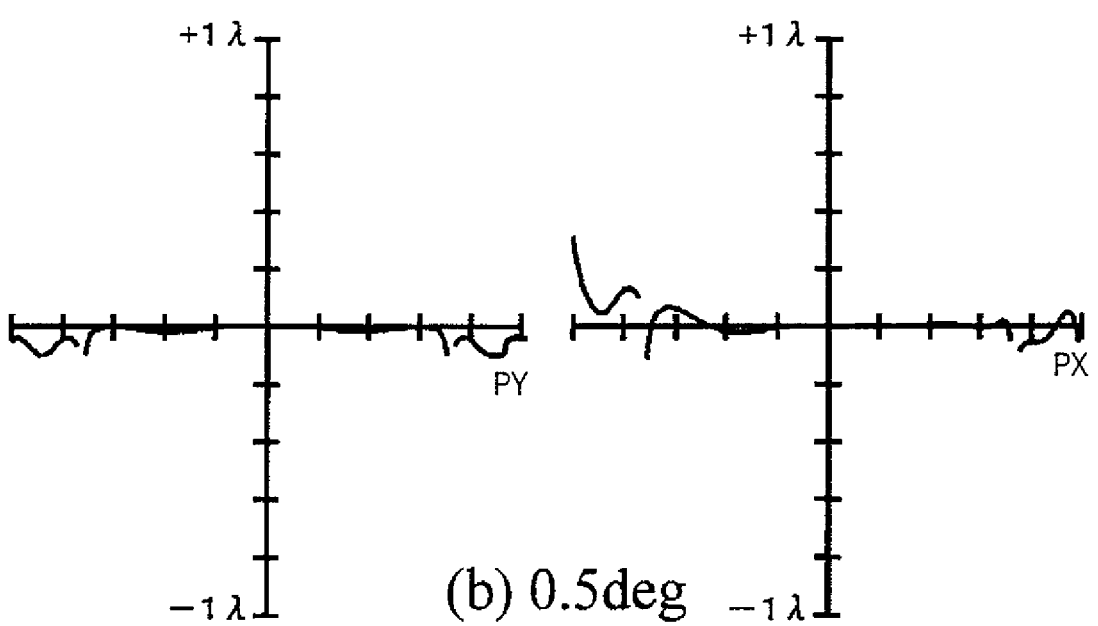
(b) 0.5deg (a)  (b)
(c)  (d)

OBJECTIVE LENS SIDE

COLLIMATOR LENS SIDE     PHASE STEP FACE

US 7,952,979 B2

COUPLING LENS, OPTICAL HEAD AND OPTICAL DISC DEVICE

TECHNICAL FIELD

The present invention relates to an optical head including a plurality of light sources of different wavelengths and performing optical information recording to or information reproduction from a plurality of types of information recording mediums such as optical discs or the like, and an optical disc apparatus including such an optical head.

BACKGROUND ART

Recently, as semiconductor lasers for emitting blue violet laser light have been put into practical use, a Blu-ray Disc (hereinafter, referred to as the "BD"), which is an optical information recording medium (hereinafter, referred to also as the "optical disc") having a higher density and a larger capacity than CDs (Compact Discs) and DVDs (Digital Versatile Discs) while having the same disc diameter therewith, has been put into practical use. A BD is an optical disc having a protective substrate thickness of about 0.1 mm which is used for performing information recording and reproduction with a blue violet laser light source for a wavelength of about 400 nm and an objective lens having a numerical aperture (NA) improved to 0.85. The "protective substrate thickness" means a thickness of a transparent layer (protective substrate) existing between a face of the optical disc on the laser light incidence side and the information recording layer.

An HD DVD having a protective substrate thickness of about 0.6 mm, which is also used with a blue violet laser light source for a wavelength of about 400 nm and an objective lens having a numerical aperture of 0.65, also has been put into practical use. These optical discs usable for performing recording or reproduction with a blue violet laser light source are collectively referred to as the "high density optical discs".

Under the circumstances, an optical head compatible for performing information recording and reproduction by collecting laser light of different wavelengths to an information recording layer of the respective optical discs having different protective substrate thicknesses using one objective lens is now proposed. In order to realize an optical head having such compatibility, various structures have been devised.

For example, Patent Document 1 discloses an optical head for emitting laser light of three wavelengths of about 405 nm, about 655 nm and about 785 nm. An objective lens mounted on this optical head has high optical performances. Specifically, this objective lens has a diffraction limited performance for optical discs having different protective substrate thicknesses.

FIG. 25 shows a structure of an objective lens 101 described in Patent Document 1. The objective lens 101 includes a reference lens 101a formed of a glass material and a close contact lens 101b formed of a resin material. The close contact lens 101b is formed of a material different from that of the reference lens 101a, and is cemented to or bonded to a face of the reference lens 101a on the optical disc side, in a close contact or substantially close contact manner. Patent Document 1 describes that such an objective lens 101 realizes recording to or reproduction from a high density optical disc, DVD and CD using blue violet laser light.

The objective lens utilizes the difference in the refractive index and dispersion between the reference lens and the close contact lens, and compensates for the aberration for two or three different wavelengths only by the refractive power of the lens. Therefore, as opposed to an objective lens using diffraction, the above-described objective lens has a feature of losing substantially no light amount and thus providing a high light utilization efficiency for all the wavelengths.

By contrast, an optical head having an objective lens which does not use a reference lens or a close contact lens is also known. Specifically, this optical head has diffraction grating on a lens face of one objective lens. This optical head utilizes the diffraction of light to collect laser light of three wavelengths to an information recording layer of the respective optical discs having different protection substrate thicknesses.

As a modification of the above-described optical head, an optical head including a coupling lens having a diffraction function between a light source and an objective lens.

Patent Document 1: International Publication No. 2004/053557 pamphlet

DISCLOSURE OF THE INVENTION

Problems to be Solved by the Invention

With the conventional art, the wavelength dispersion compensation ability is not taken into consideration, and also it is difficult to sufficiently obtain the correction effect on the spherical aberration caused by a difference in the protective substrate thickness among optical discs.

By contrast, in Patent Document 1, examples 1 through 5 refer to the performance of conducting information recording to or information reproduction from a high density optical disc, DVD and CD by commonly using the above-described objective lens (compatibility performance).

However, for instance, in example 1 of Patent Document 1, a change in the best image point position of the RMS wavefront aberration with respect to a wavelength change of ±1 nm at the central wavelength of blue violet laser light of 405 nm is as large as 1 µm or greater. With such a value of change, the wavelength dispersion compensation ability is not considered to be sufficient.

In examples 6 and 7 of Patent Document 1, designing examples of an objective lens having a good wavelength dispersion compensation ability are shown. However, in this objective lens, both the reference lens and the close contact lens are formed of glass materials, and no specific method for producing the objective lens is described. In actuality, it is difficult to first form two glass lenses by molding with high precision and then produce an objective lens by cementing or bonding the two glass lenses.

Example 7 of Patent Document 1 describes that laser light is incident on the objective lens as diverging light for recording data to or reproducing data from a CD or a DVD. However, since the object point distance of, especially, a CD is as small as 19.5 mm, it is practically very difficult to produce an optical head. In fact, no specific structure of the optical head is described.

A spherical aberration is caused when the central wavelength of the laser light for high density optical discs is varied. A spherical aberration (chromatic spherical aberration) caused when the wavelength is varied by ±5 nm exceeds 100 mλ. However, example 1 of Patent Document 1 does not present any view on such an important issue, or does not provide any method for compensating for the chromatic spherical aberration.

With the optical head described in Patent Document 1, the object point distances of the three wavelengths are different from one another. Therefore, it is expected that, for example, the arrangement of the light emitting point and the light receiving point of each wavelength on the optical head is complicated. However, Patent Document 1 does not describe anything about this problem. For instance, in example 7 of Patent Document 1, the object point distances of a CD and a DVD are respectively 20 mm and 38 mm, which are very small. Patent Document 1 does not disclose any structure of such a small optical head, and it is not clear whether such an optical head is feasible.

The working distance (WD) of an objective lens with respect to a CD is preferably large from the viewpoint of avoiding the collision of the objective lens and the CD. However, in example 4 of Patent Document 1, the working distance of the objective lens is as small as about 0.38 mm at the maximum, which is not sufficient for an objective lens used for an optical head for recordable CDs.

An optical head for obtaining the compatibility performance using the diffraction action encounters a serious problem that the light amount is decreased when the light is diffracted. Light passes the diffraction grating in a forward path from the light source to the optical disc and also in a return path from the position where the light is reflected by the optical disc up to the position where the light is detected. Each time the light passes the diffraction grating, the light amount is decreased. Therefore, the output of the light source needs to be made large in consideration of the amount to be decreased, which is against lowering the power of the light source.

As the information recording layer is made more and more multi-layered, a high output is required especially for recording. In order to make the output large in consideration of the decrease in the light amount, a laser light source corresponding to a large output needs to be used. This requires a high-level production technology. As a result, the production cost of the optical head is raised.

For laser light of a specific wavelength range, it is possible to design diffraction grating so as to provide a desired diffraction action while suppressing the decrease in the light amount. However, it is very difficult to provide a desired diffraction action while avoiding the decrease in the light amount for the laser light of all the plurality of wavelengths.

An object of the present invention is to realize, with a feasible optical system, an optical head and an optical disc apparatus for collecting laser light of three different wavelengths on an information recording layer of the respective optical discs having different protective substrate thicknesses using one objective lens, compensating for various types of aberration, including the aberration caused by a wavelength change, for a high density optical disc, a DVD and a CD, and thus providing a good recording or reproduction performance.

Means for Solving the Problems

A coupling lens according to the present invention is incorporated into an optical head for collecting laser light emitted from a plurality of light sources and having different wavelengths on an information recording layer of different types of optical information recording mediums respectively. The coupling lens comprises a first lens and a second lens which are substantially in close contact with each other such that optical axes thereof match each other and designed such that the laser light having different wavelengths are refracted by the close contact face. The coupling lens is afocal for the shortest wavelength among the different wavelengths of the laser light.

The coupling lens may have three lens faces crossing the optical axis. The coupling lens may have a first lens face, which is a face of the first lens which is not in contact with the second lens, a second lens face, which is a contact face of the first lens and the second lens which are substantially in close contact with each other, and a third lens face, which is a face of the second lens which is not in contact with the first lens. At least one of the first lens face, the second lens face and the third lens face may be formed to have an aspheric shape.

In an effective area of at least one of the first lens face, the second lens face and the third lens face, a first effective area encompassing the optical axis and a second effective area located outside the first area may be formed to have different aspheric shapes.

Regarding the effective area of at least one of the first lens face, the second lens face and the third lens face, an aspheric coefficient used to define the shape of the first effective area and an aspheric coefficient used to define the shape of the second effective area may be different from each other.

In each of the first lens face, the second lens face and the third lens face, the first effective area and the second effective area may be formed to have different aspheric shapes.

The first lens may act as a concave lens and the second lens may act as a convex lens.

The first lens and the second lens may be cemented or bonded to each other.

The coupling lens may further comprise a holder for holding the first lens and the second lens in close contact with each other.

The first lens and the second lens may be formed of different resin materials.

The first lens may have an optical step.

One of the first lens and the second lens may be formed of a glass material, and the other of the first lens and the second lens may be formed of a resin material.

One of the first lens and the second lens may be formed of an ultraviolet curable resin.

The resin materials may have a glass transition temperature of 300° C. or lower.

The first lens and the second lens may be formed of different glass materials.

A difference between the glass transition temperature of the glass material for the first lens and the glass transition temperature of the glass material for the second lens may be 200° C. or greater.

An optical head according to the present invention comprises a plurality of light sources for emitting laser light having different wavelengths; an objective lens; and the above-described coupling lens, which is located on an optical path between the plurality of light sources and the objective lens. The laser light having different wavelengths is collected on an information recording face of different types of optical information recording mediums respectively by the objective lens and the coupling lens.

The plurality of light sources may include a first light source for emitting laser light having a wavelength $\lambda 1$, a second light source for emitting laser light having a wavelength $\lambda 2$, and a third second light source for emitting laser light having a wavelength $\lambda 3$. The wavelengths $\lambda 1$, $\lambda 2$ and $\lambda 3$ may fulfill 350 nm<$\lambda 1$<450 nm, 600 nm<$\lambda 2$<700 nm, and 750 nm<$\lambda 3$<850 nm.

The coupling lens may correct a chromatic aberration of the objective lens which is caused by a change of the wavelength $\lambda 1$.

Where an Abbe number represented using the refractive index of the first lens at d line (wavelength: 587.56 nm), F line (wavelength: 486.13 nm) and C line (wavelength: 656.27 nm) is vd1 and an Abbe number represented using the refractive index of the second lens at d line, F line and C line is vd2, the Abbe number vd1 and the Abbe number vd2 may fulfill vd1<vd2.

The Abbe number vd1 and the Abbe number vd2 may fulfill vd1<35 and vd2>50.

The optical head may further comprise a conversion section for converting the laser light into substantially parallel light, diverging light or converging light in accordance with the wavelength of the laser light and allowing the laser light to be incident on the objective lens.

The conversion section may include a collimator lens for allowing at least the laser light having the wavelength $\lambda 1$ to be incident on the objective lens as substantially parallel light, and a driving section for moving the collimator lens in an optical axis direction based on a driving signal corresponding to the wavelength of the laser light which is being emitted.

When the laser light having the wavelength $\lambda 1$ is collected on an optical recording medium, a spherical aberration is generated at a focal point of the laser light by the thickness of an optical transmissive layer of the optical recording medium. The conversion section may move the collimator lens in the optical axis direction and corrects the spherical aberration.

The optical head may further comprise an actuator having a movable section, physically connected with the objective lens, for changing the position of the objective lens. The coupling lens may be fixed to the movable section of the actuator and may move integrally with the objective lens.

An optical drive according to the present invention comprises any of the above-described optical heads; a motor for driving an optical recording medium to be rotated; and a control section for controlling the optical head and the motor.

EFFECTS OF THE INVENTION

By incorporating a coupling lens according to the present invention into an optical head, such an optical head obtains a diffraction limited performance and a high wavelength dispersion compensation ability for a high density optical disc such as a BD or the like, a DVD and a CD.

An optical disc apparatus having such an optical head mounted thereon has superb recording and reproduction performances owing to the above-mentioned ability and performance.

When a coupling lens according to the present invention is used, the structure of the optical disc head is simplified and therefore can be reduced in size. As a result, an optical disc apparatus having such an optical head mounted thereon can also be reduced in size and thickness.

A coupling lens according to the present invention can be formed of a resin material, and therefore is easily molded and produced at low cost.

When such a coupling lens is combined with an objective lens, light from the light source is collected on the corresponding optical information recording medium by a refraction action, not by a diffraction action. Unlike the diffraction action, the refraction action does not decrease the light amount. Therefore, for outputting light from the light source, it is not necessary to increase the output in consideration of the decrease in the light amount. For this reason, the optical head does not need to include a light source corresponding to a large output, and thus can be produced at low cost.

BRIEF DESCRIPTION OF THE DRAWINGS

FIG. 17 shows wavefront aberration diagrams obtained when laser light having a wavelength of 405 nm is focused on the BD 60.

DESCRIPTION OF THE REFERENCE NUMERALS

Figure 1:
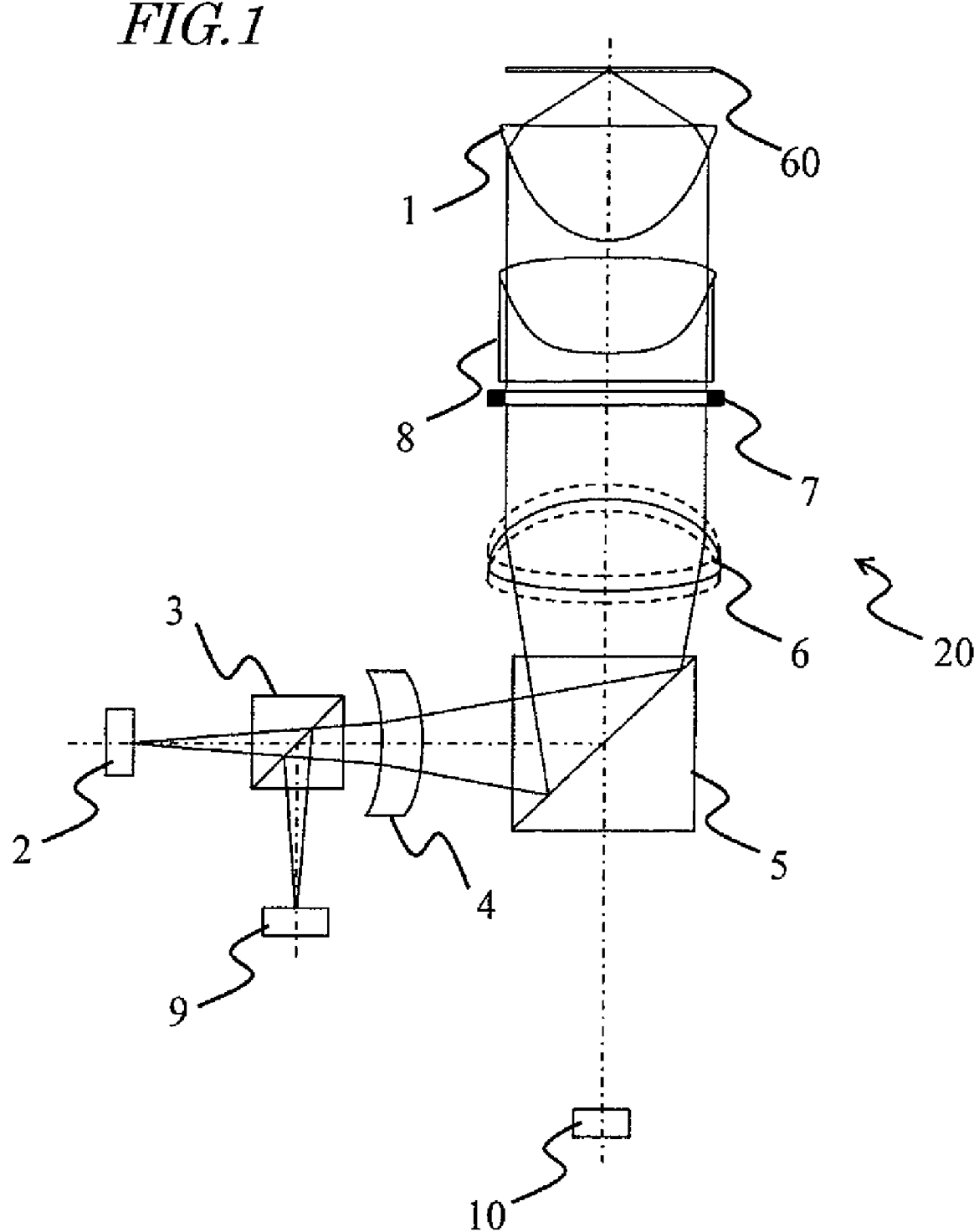
FIG. 1 is a schematic structural view of an optical head 20 according to Embodiment 1.

1 Objective lens
2 Light source
3 Beam splitter
4 Relay lens
5 Dichroic prism
6 Collimator lens
7 Aperture restriction element 8, 18 Coupling lens
8a, 18a First lens
8b, 18b Second lens
9 Light receiving element
10 Light receiving/emitting integrated element
20, 30 Optical head
31 Stepping motor
32 Screw shaft
33 Lens holder
34 Guide
50 Optical disc apparatus
51 Optical disc driving section
52 Control section
53 Optical head
60 BD
70 DVD
80 CD
81 First face
82 Second face
83 Third face
101 Objective lens
101a Reference lens
101b Close contact lens
181i First face common area
181o First face dedicated area
182i Second face common area
182o Second face dedicated area
183i Third face common area
183o Third face dedicated area

BEST MODE FOR CARRYING OUT THE INVENTION

Hereinafter, with reference to the attached drawings, embodiments of a coupling lens, an optical head incorporating the coupling lens, and an optical disc apparatus using the optical head according to the present invention will be described.

In the following embodiments, a so-called three-wavelength compatible optical head will be described. The optical head is mounted on an optical disc apparatus (optical disc drive) and irradiates an optical disc with laser light of one of the three wavelengths in accordance with the type of the optical disc, to record information to the optical disc or reproduce information from the optical disc.

Here, it is assumed that the types of the optical discs are BD, DVD and CD. For simplicity of description, it is assumed that each optical disc has one information recording layer, hereinafter.

The protective substrate thickness of the BD is about 0.1 mm. The wavelength of the laser light used for information recording to the BD and/or information reproduction from the BD is about 405 nm. The numerical aperture NA of an objective lens 1 corresponding to the BD is 0.85.

The protective substrate thickness of the DVD is about 0.6 mm. The wavelength of the laser light corresponding to the DVD is about 655 nm.

The protective substrate thickness of the CD is about 1.2 mm. The wavelength of the laser light corresponding to the CD is about 785 nm.

Hereinafter, the wavelengths of the laser light corresponding to the BD, DVD and CD will be specified by the respective reference wavelengths (405 nm, 655 nm and 785 nm).

With the optical head according to the present invention, laser light of any of the three wavelengths is directed from a common objective lens toward the optical disc.

The optical disc according to the present invention includes a coupling lens.

Blue violet laser light is focused on the information recording layer of the BD only by the refractive effect of the coupling lens and the objective lens. Since the diffraction grating is not provided, the transmission efficiency of the laser light is maintained to a level close to 100%. As a result, the laser power required for information recording or information reproduction can be kept low. This is more effective for keeping power consumption low for information recording, which requires a higher power than information reproduction.

An objective lens including diffraction grating cannot improve the transmission efficiency with a good balance among all the wavelengths of light. The reason is that a diffraction efficiency closer to 100% cannot be obtained for all the wavelengths of light when the laser light of each wavelength is focused on the information recording layer of the CD, DVD or BD. It is possible to set the diffraction efficiency of BD at a level close to 100%, but this may result in, for example, the diffraction efficiency for DVD being decreased to 50% or lower. Regarding a wavelength of a low diffraction efficiency, the amount of laser light directed to the optical disc is decreased, and also the amount of laser light received after being reflected by the optical disc is further decreased. In order to acquire a required amount of reflected light with certainty, the laser power needs to be set high. For this reason, an objective lens which does not use the diffraction grating is preferable.

In addition, the coupling lens according to the present invention is capable of reducing a change in the chromatic aberration caused in the objective lens by a change in the wavelength of the laser light. This effect is especially high for blue violet laser light. Therefore, even if the wavelength of the blue violet laser light is changed when, for example, a reproduction operation is switched to a recording operation, the lens according to the present invention is unlikely to be influenced by such a change. Thus, accurate recording and reproduction operations can always be performed. Especially because it is highly possible that a failure in recording causes a fatal loss of data, the ability of performing an accurate recording operation is very important. For this reason, a combination of the coupling lens and the objective lens according to the present invention is preferable.

Embodiment 1

FIG. 1 is a schematic structural view of an optical head 20 according to this embodiment.

The optical head 20 includes an objective lens 1, a light source 2, a beam splitter 3, a relay lens 4, a dichroic prism 5, a collimator lens 6, an aperture restriction element 7, a coupling lens 8, a light receiving element 9, and a light receiving/emitting integrated element 10.

The light source 2 emits blue violet laser light, and the light receiving/emitting integrated element 10 includes a light source for emitting red laser light and a light source for emitting infrared laser light. The light receiving/emitting integrated element 10 also includes elements for receiving light reflected by a CD and a DVD integrated therein. In this embodiment, the "light source" means each independent light source for emitting each of blue violet laser light, red laser light, and infrared laser light. The entirety of the light receiving/emitting integrated element 10 may be regarded as one light source, but in this embodiment, will be described as including two light sources.

The dichroic prism 5 reflects light of wavelengths equal to or shorter than a prescribed wavelength. The light receiving element 9 receives blue violet laser light. The coupling lens 8 is held by a movable section of a biaxial actuator (not shown) for driving the objective lens 1 and is driven integrally with the objective lens 1 in a focusing direction and a tracking direction. In FIG. 1, a BD 60 is shown for reference.

Hereinafter, an operation of the optical head 20 for performing information recording to or information reproduction from the BD 60 will be described. Blue violet laser light having a wavelength of 405 nm emitted from the light source 2 is transmitted through the beam splitter 3 and the relay lens 4. After being reflected by the dichroic prism 5, the blue violet laser light is converted into substantially parallel light by the collimator lens 6, and is restricted by the aperture restriction element 7 such that the numerical aperture is 0.85. Then, the blue violet laser light is transmitted through the coupling lens 8 and is collected by the objective lens 1 as an optical spot on an information recording layer of the BD 60 beyond the protective substrate.

The laser light reflected by the information recording layer of the BD 60 is again transmitted through the objective lens 1, the coupling lens 8, the aperture restriction element 7 and the collimator lens 6, is reflected by the dichroic prism 5, is transmitted through the relay lens 4, then is reflected by the beam splitter 3, and is guided to the light receiving element 9.

Now, with reference to FIG. 2, an operation of the optical head 20 for performing information recording to or information reproduction from a DVD 70 will be described. Then, with reference to FIG. 3, an operation of the optical head 20 for performing information recording to or information reproduction from a CD 80 will be described.

Figure 2:
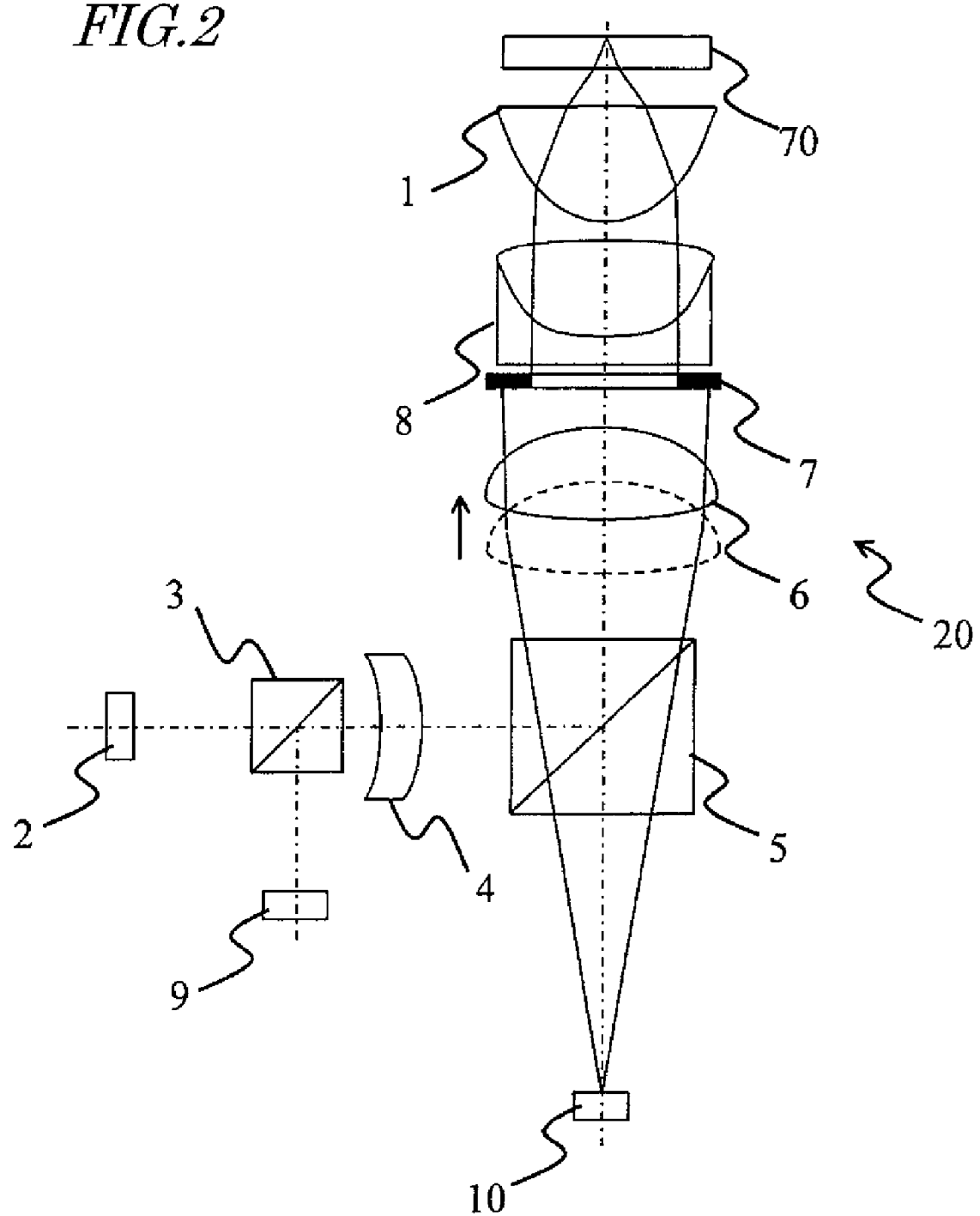
FIG. 2 shows a state of an optical path in the optical head 20 when the optical disc is a DVD 70.

FIG. 2 shows a state of an optical path in the optical head 20 when the optical disc is the DVD 70.

Red laser light having a wavelength of 655 nm emitted from the light receiving/emitting integrated element 10 is transmitted through the dichroic prism 5, is converted into diverging light by the collimator lens 6 moved toward the objective lens 1, and is restricted by the aperture restriction element 7 such that the numerical aperture is 0.60. Then, the red laser light is transmitted through the coupling lens 8 and is collected by the objective lens 1 as an optical spot on an information recording layer of the DVD 70 beyond the protective substrate. The laser light reflected by the information recording layer of the DVD 70 is again transmitted through the objective lens 1, the coupling lens 8, the aperture restriction element 7, the collimator lens 6 and the dichroic prism 5, and is returned to, and received by, the light receiving/emitting integrated element 10.

Figure 3:
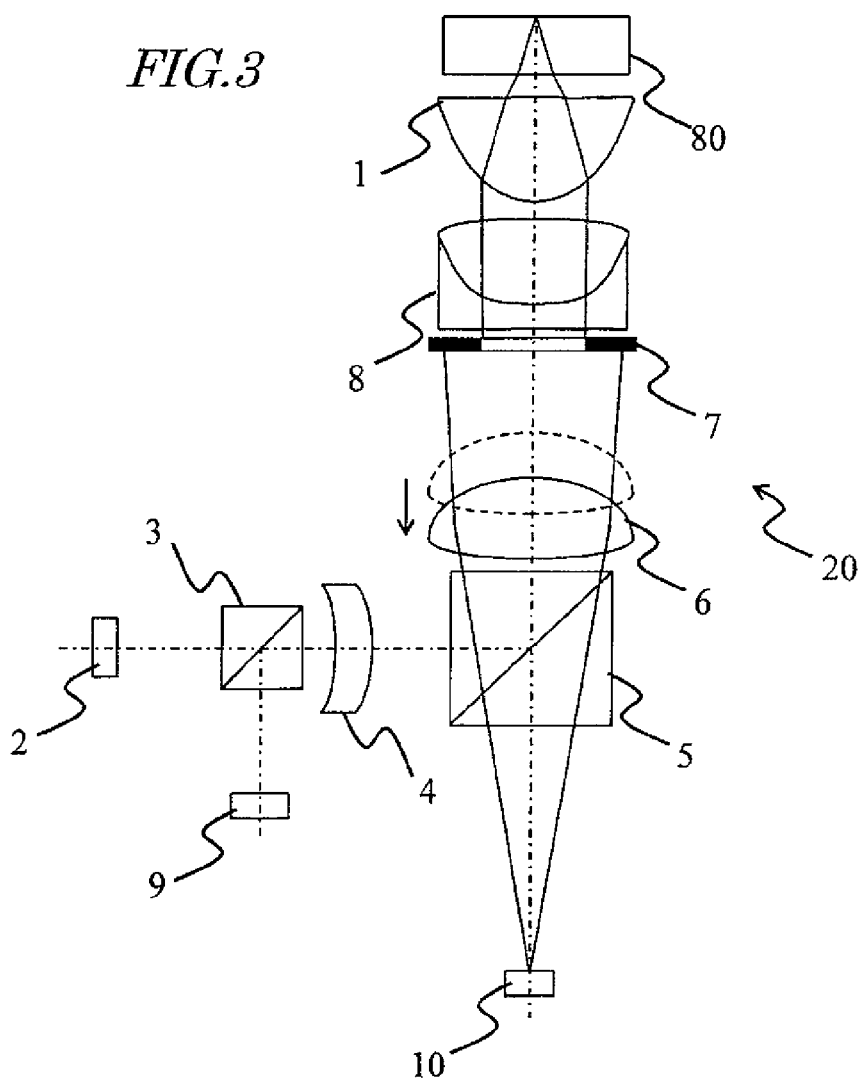
FIG. 3 shows a state of an optical path in the optical head 20 when the optical disc is a CD 80.

FIG. 3 shows a state of an optical path in the optical head 20 when the optical disc is the CD 80.

Infrared laser light having a wavelength of 785 nm emitted from the light receiving/emitting integrated element 10 is transmitted through the dichroic prism 5, is converted into diverging light by the collimator lens 6 moved toward the light receiving/emitting integrated element 10, and is restricted by the aperture restriction element 7 such that the numerical aperture is 0.47. Then, the infrared laser light is transmitted through the coupling lens 8 and is collected by the objective lens 1 as an optical spot on an information recording layer of the CD 80 beyond the protective substrate. The laser light reflected by the information recording layer of the CD 80 is again transmitted through the objective lens 1, the coupling lens 8, the aperture restriction element 7, the collimator lens 6 and the dichroic prism 5, and is returned to, and received by, the light receiving/emitting integrated element 10.

Now, with reference to FIG. 4 through FIG. 9, the coupling lens 8 according to this embodiment will be described in detail.

Figure 4:
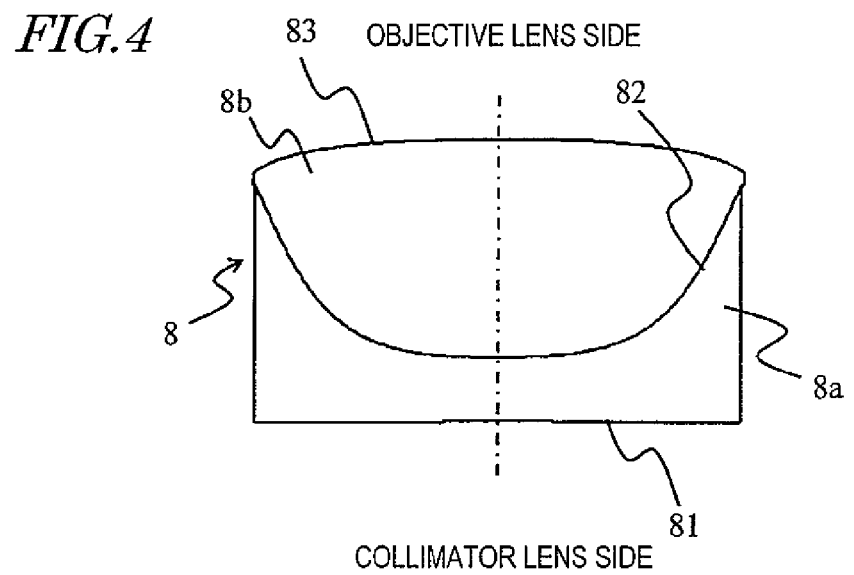
FIG. 4 is a schematic structural view of a coupling lens 8.
Figure 5:
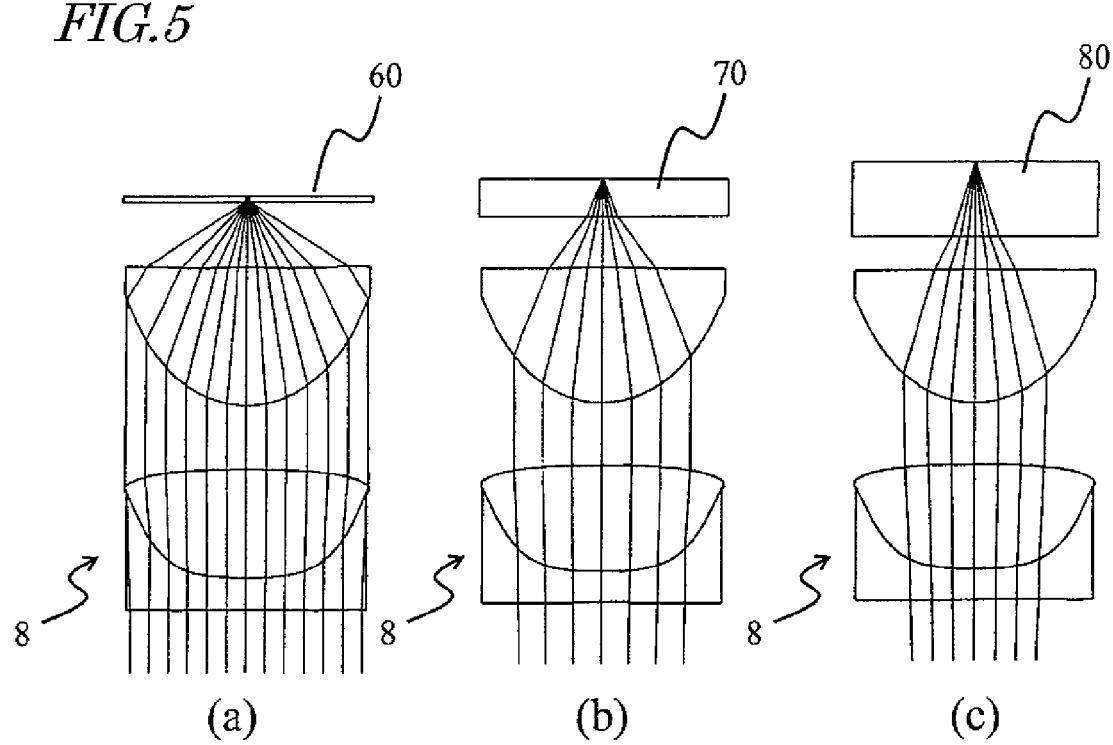
FIGS. 5(a) through (c) each show a state of a light beam when laser light is focused on an information recording layer of each of a BD 60, the DVD 70 and the CD 80 using the coupling lens 8 and an objective lens 1 according to this embodiment.

FIG. 4 is a schematic structural view of the coupling lens 8. The coupling lens 8 includes a first lens 8a and a second lens 8b. When mounted on the optical head 20, the first lens 8a is directed toward the collimator lens 6 and the second lens 8b is directed toward the objective lens 1.

In this embodiment, three lens faces of the coupling lens 8 which cross an optical axis are defined. A first face 81 is a lens face of the first lens 8a which does not face the second lens 8b. A second face 82 is a close contact face of the first lens 8a and the second lens 8b which are substantially in close contact with each other. A third face 83 is a lens face of the second lens 8b which does not face the first lens 8a.

One feature of the coupling lens 8 in this embodiment is that the first lens 8a and the second lens 8b are substantially in close contact with each other such that the optical axes thereof match each other; blue violet laser light, red laser light and infrared laser light are refracted at the close contact face 82; and the coupling lens 8 is designed to be afocal with respect to the blue violet laser light having the shortest wavelength.

Herein, the term "afocal" means that the focal length is infinite. The expression "the coupling lens 8 is afocal with respect to the blue violet laser light" means that the power of the convex lens and the power of the concave lens of the coupling lens 8 are equal with respect to the blue violet laser light. It should be noted that the blue violet laser light also is refracted at the first face 81, the second face (close contact face) 82 and the third face 83. By the refractive action of the lens, the diameter of an incident beam of the laser light may be expanded or contracted before being output from the coupling lens 8.

The first lens 8a and the second lens 8b are cemented or bonded together while being in close contact or substantially close contact with each other at the second face 82. The face of the first lens 8a which is cemented or bonded to the second lens 8b, and the face of the second lens 8b which is cemented or bonded to the first lens 8a, have the same or substantially the same aspheric shape. The first lens 18a and the second lens 18b, which are molded separately, can be held in substantially close contact by being inserted into a prescribed holder.

The first lens 8a is formed of polycarbonate (nd=1.584; vd=30.1), and the second lens 8b is formed of ZEONEX330R (nd=1.508; vd=56.5). Herein, the refractive index nd represents the refractive index at d line (wavelength: 587.56 nm), and the Abbe number vd is represented using the refractive indices at d line, F line (wavelength: 486.13 nm) and C line (wavelength: 656.27 nm).

The aspheric shape of the first face 81, the aspheric shape of the second face 82 and the aspheric shape of the third face 83 are determined by the aspheric shape represented by expression (1) below.

$$Z=(1/R)h^2/[1+[1-(1+k)\cdot(1/R)^2h^2]^{1/2}]+\Sigma A_i h^{2i} \quad (1)$$

In this expression, h is the distance from the apex on the optical axis in a direction perpendicular to the optical axis, R is the radius of curvature, k is the conic constant, and Ai is the aspheric coefficient where i=0th to 8th term. Z is determined by h, R, k and Ai, and is the distance (sag) from the tangent plane of the apex in an optical axis direction. The curve determined by the value of Z gives the aspheric cross-sectional shape of each of the faces.

Tables 1 through 3 show the specifications of the coupling lens 8.

TABLE 1

| Face No. | Radius of curvature | Face separation | Material |
|---|---|---|---|
| 1 | −47.385 | 0.50 | Polycarbonate |
| 2 | 7.634 | 1.70 | ZEONEX330R |
| 3 | −19.839 | — | — |

TABLE 2

Aspheric coefficient of the coupling lens

| Lens face | First face | Second face (border face) | Third face |
|---|---|---|---|
| k | −4.998748E+02 | 1.339743E+01 | 6.841691E+01 |
| A1 | 0.000000E+00 | 0.000000E+00 | 0.000000E+00 |
| A2 | 9.779752E−03 | 4.998982E−02 | −5.455447E−04 |
| A3 | 1.359560E−03 | 1.947603E−02 | −9.351682E−04 |
| A4 | −2.833996E−04 | 7.139013E−04 | −6.119682E−04 |
| A5 | −3.452001E−04 | −1.478104E−03 | −1.009399E−04 |
| A6 | −1.345624E−04 | −9.430643E−04 | 1.850666E−05 |
| A7 | 9.805895E−06 | −2.334123E−04 | −5.595202E−06 |
| A8 | 1.279059E−05 | 2.770767E−04 | −1.723416E−05 |

TABLE 3

Used wavelength, material refractive index, separation

| | | | | |
|---|---|---|---|---|
| Wavelength | [nm] | 405 | 655 | 785 |
| Synthesized focal length | [mm] | 2.22 | 2.30 | 2.31 |
| Refractive index of first lens | | 1.61736 | 1.57849 | 1.57203 |
| Refractive index of second lens | | 1.52331 | 1.50512 | 1.50188 |
| Numerical aperture | | 0.85 | 0.6 | 0.47 |
| Aperture diameter | [mm] | 3.73 | 2.79 | 2.25 |
| Object point distance | [mm] | ∞ | 65 | 30 |
| Working distance | [mm] | 0.988 | 0.785 | 0.507 |
| Protective substrate thickness | [mm] | 0.0875 | 0.6 | 1.2 |

In Table 1, the face numbers are allocated as follows. Face number 1 represents the first face 81, face number 2 represents the second face (close contact face) 82, and face number 3 represents the third face 83. Given as the face separation and the material are the separation, and the material filling the separation, between the face represented by the respective face number and the face represented by the next face number.

In Table 2, "E+02" to "E−06" respectively represent $10^2$ to $10^{-6}$.

The objective lens 1 used in combination with the coupling lens 8 is an objective lens having a focal length of 2.3 mm dedicated for the BD 60. With the objective lens 1, the spherical aberration becomes substantially zero when parallel light having a wavelength of 405 nm is incident on the BD 60 having a protective substrate thickness of 0.0875 mm. The spherical aberration caused by the difference in the protective layer thickness can be corrected by allowing slightly diverging light to be incident when the protective layer thickness is 0.1 mm whereas allowing slightly converging light to be incident when the protective layer thickness is 0.075 mm.

The object point distance in Table 3 indicates that for performing recording to or reproduction from the BD 60, light of an afocal object point distance, namely, parallel light is incident; for performing recording to or reproduction from the DVD 70, diverging light of an object point distance of +65 mm is incident; for performing recording to or reproduction from the CD 80, diverging light of an object point distance of +30 mm is incident.

FIGS. 5(a) through (c) each show a state of a light beam when laser light is focused on an information recording layer of each the BD 60, the DVD 70 and the CD 80 using the coupling lens 8 and the objective lens 1 according to this embodiment. For recording or reproducing information, the light beam assumes the state shown in each figure.

FIG. 5(a) shows the state of the light beam when laser light having a wavelength of 405 nm is collected with an NA of 0.85 and focused on the BD 60 having a protective substrate thickness of 0.0875 mm. Similarly, FIG. 5(b) shows the state of the light beam when laser light having a wavelength of 655 nm is collected with an NA of 0.60 and focused on the DVD 70 having a protective layer thickness of 0.6 mm. FIG. 5(c) shows the state of the light beam when laser light having a wavelength of 785 nm is collected with an NA of 0.47 and focused on the CD 80 having a protective layer thickness of 1.2 mm. All the figures show the states while information is being recorded or reproduced.

From FIGS. 5(a) through (c), it is understood that different wavelengths of laser light pass different areas.

Figure 6:
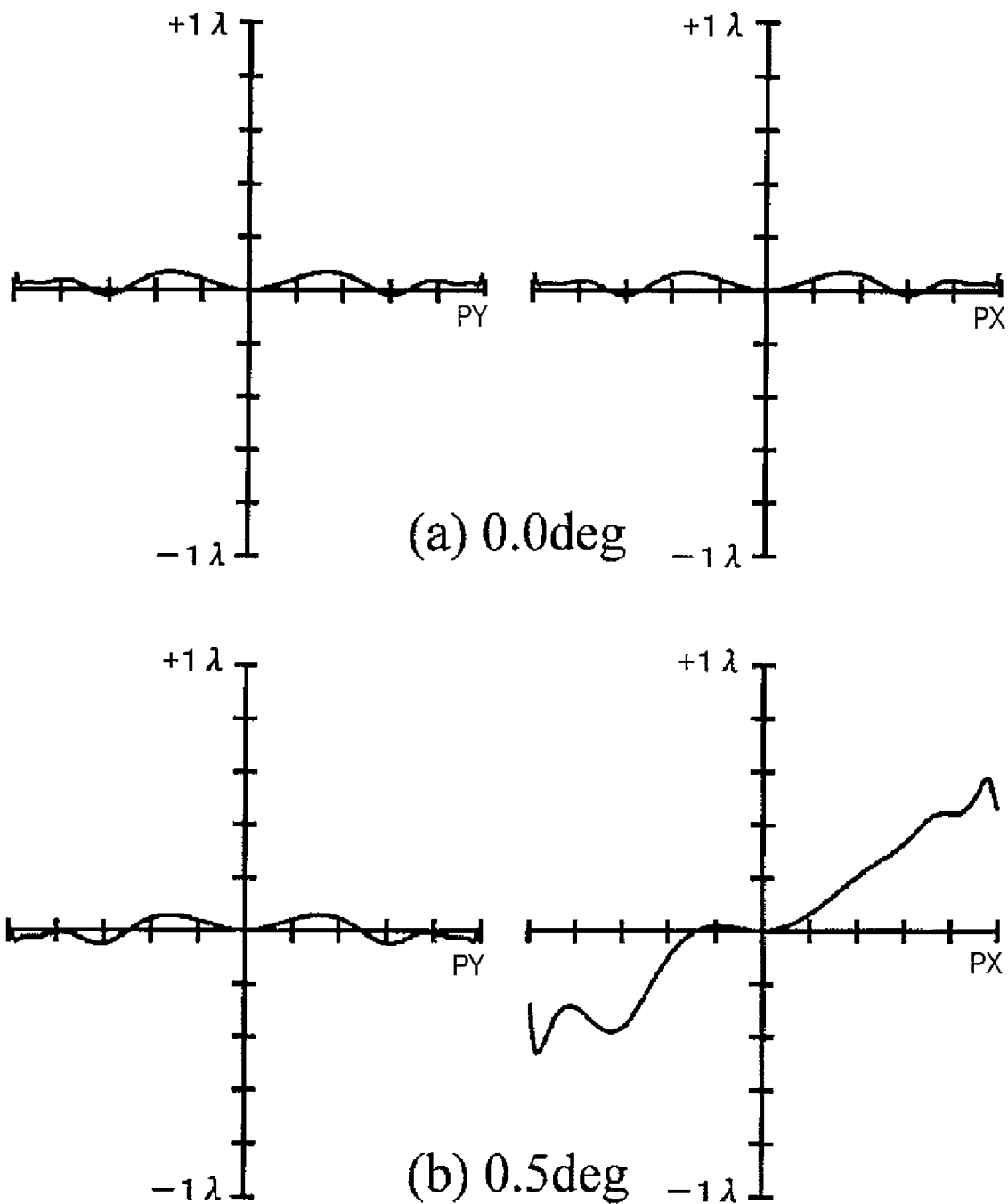
FIG. 6 shows wavefront aberration diagrams obtained when laser light having a wavelength of 405 nm is focused on the BD 60.
Figure 7:
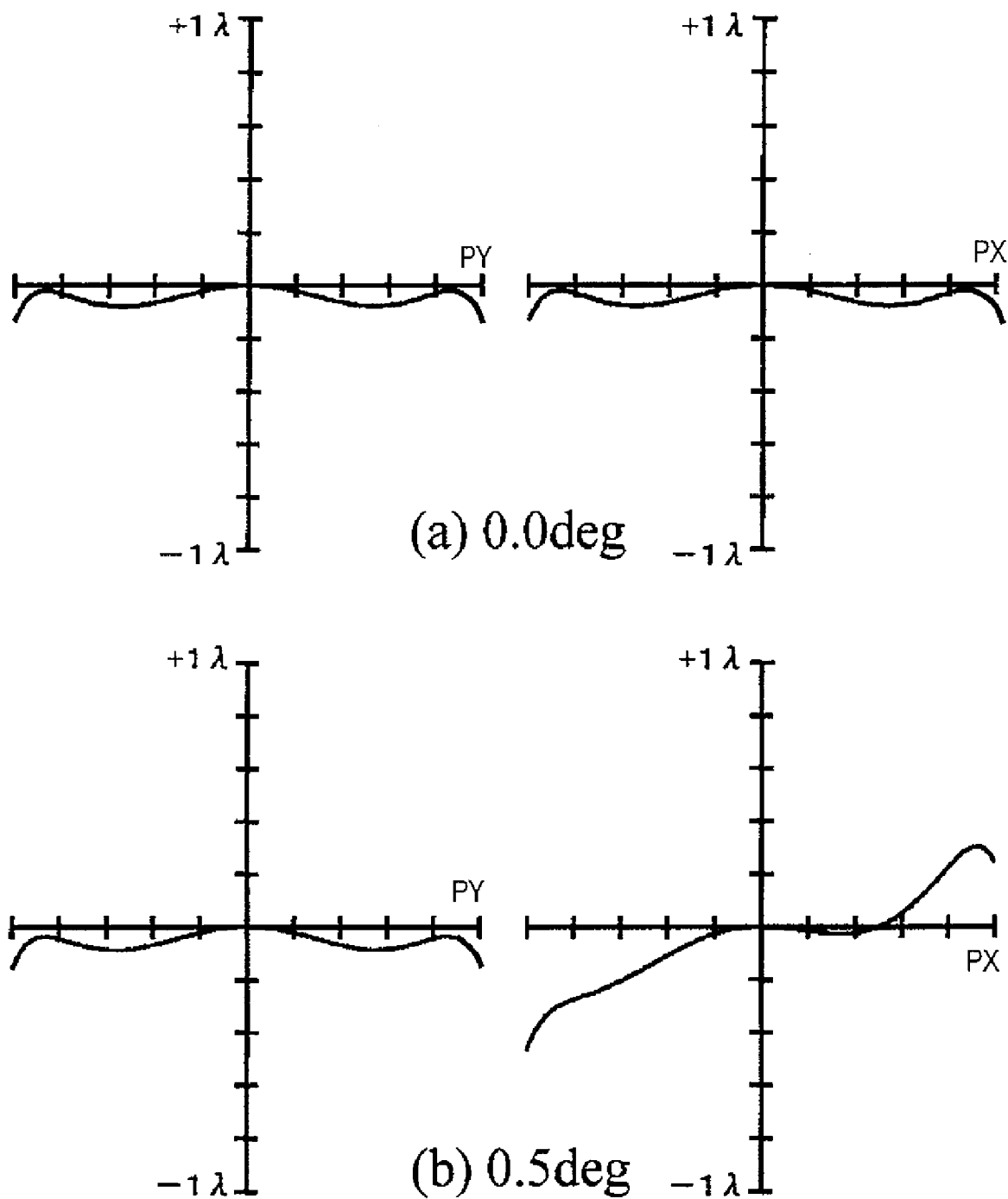
FIG. 7 shows wavefront aberration diagrams obtained when laser light having a wavelength of 655 nm is focused on the DVD 70.
Figure 8:
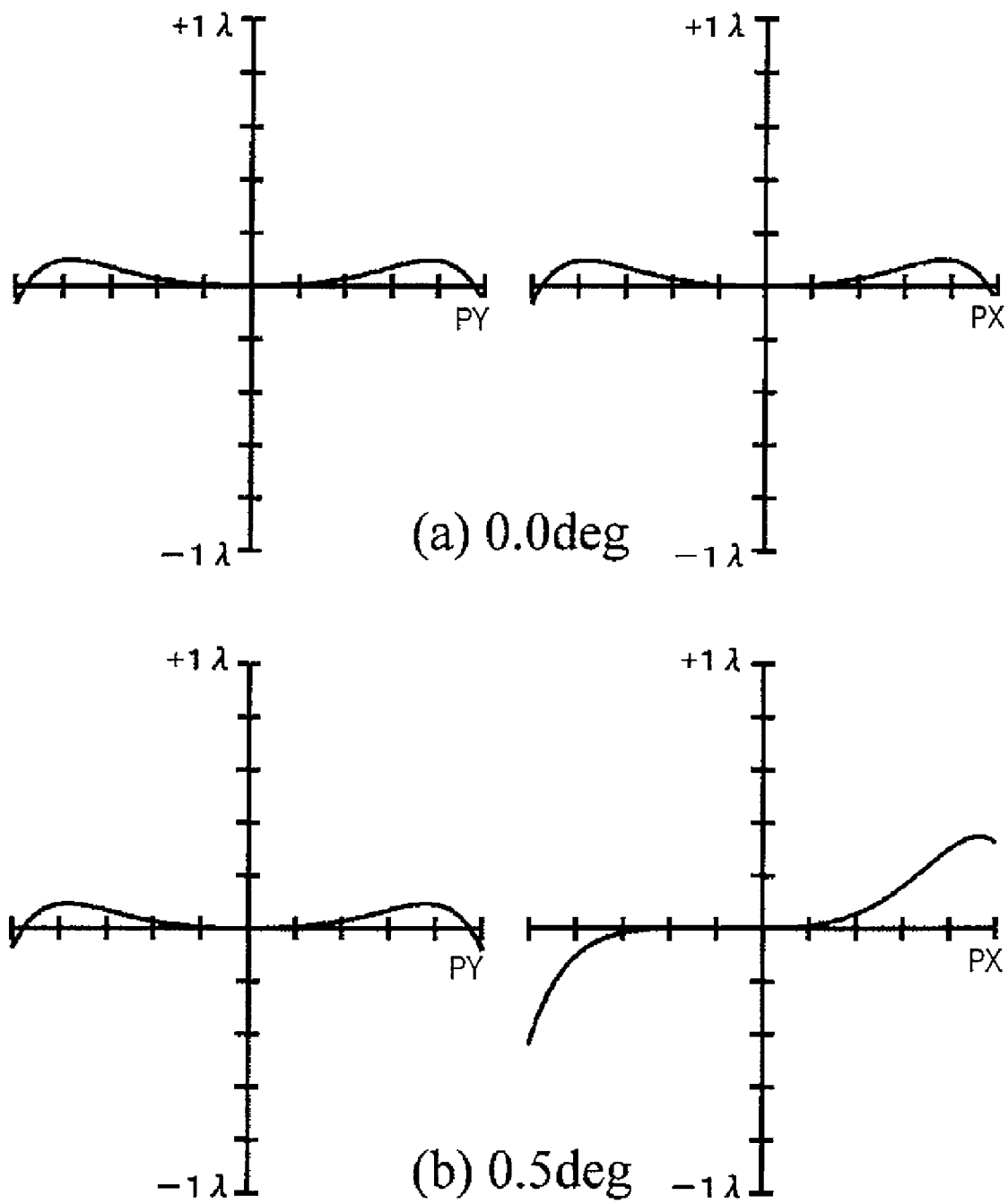
FIG. 8 shows wavefront aberration diagrams obtained when laser light having a wavelength of 785 nm is focused on the CD 80.

FIG. 6 shows wavefront aberration diagrams obtained when the laser light having a wavelength of 405 nm is focused on the BD 60 at the angle of incidence of 0.0 deg ((a)) and 0.5 deg ((b)). Similarly, FIG. 7 shows wavefront aberration diagrams obtained when the laser light having a wavelength of 655 nm is focused on the DVD 70. FIG. 8 shows wavefront aberration diagrams obtained when the laser light having a wavelength of 785 nm is focused on the CD 80.

PX axis and PY axis shown in FIG. 6 through FIG. 8 are perpendicular to the optical axis, and PX axis is perpendicular to PY axis. The vertical axis represents the wavefront aberration. The minimum value of the scale is −1λ whereas the maximum value of the scale is +1λ (λ: wavelength). As shown in FIG. 6 through FIG. 8, it has been confirmed that even when the angle of incidence of the laser light is varied from 0.0 deg to 0.5 deg, the values of the wavefront aberration are within ±1λ.

Figure 9:
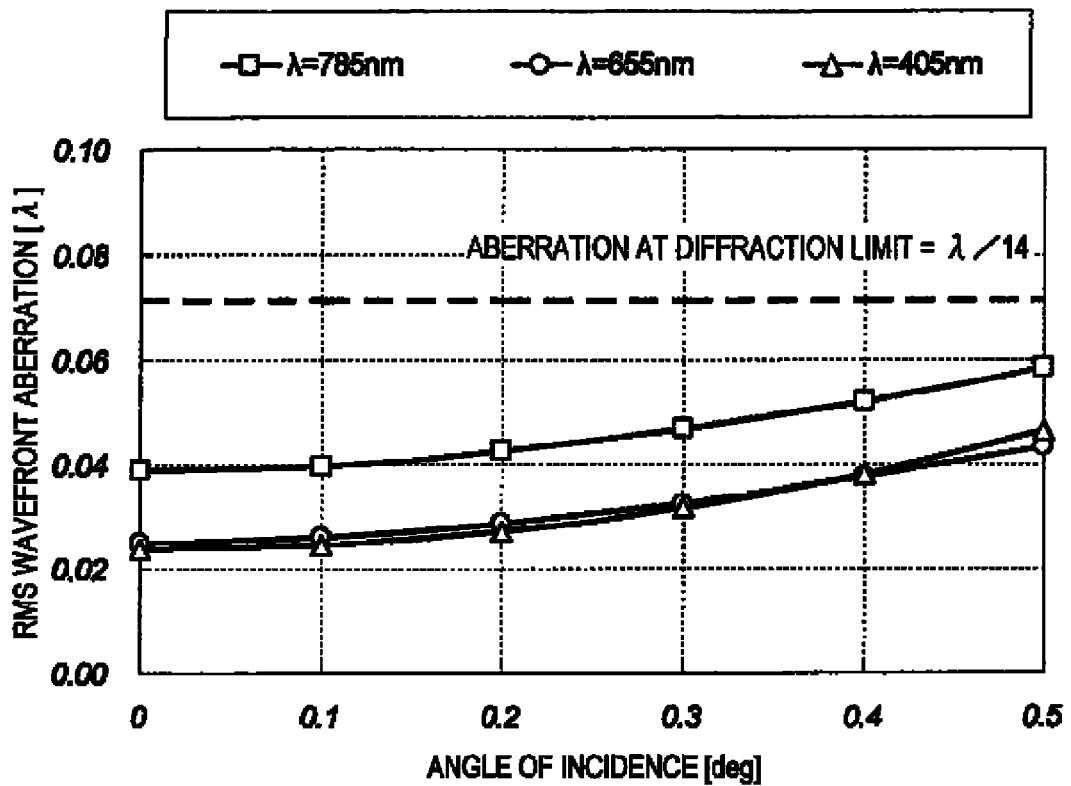
FIG. 9 is an RMS wavefront aberration diagram in which the horizontal axis represents the angle of incidence.

FIG. 9 is an RMS (Root Mean Square) wavefront aberration diagram in which the horizontal axis represents the angle of incidence. The "RMS wavefront aberration" indicates the standard deviation between the ideal wavefront and the actual wavefront. FIG. 9 shows the RMS wavefront aberrations in the case where the light having a wavelength of 405 nm is focused on the BD 60, in the case where the light having a wavelength of 655 nm is focused on the DVD 70, and in the case where the light having a wavelength of 785 nm is focused on the CD 80.

According to FIG. 9, in any of the cases, all the values of the RMS wavefront aberrations are equal or lower than the diffraction limit of 0.07λ (λ/14) when the angle of incidence is 0.0 deg to 0.5 deg. This means that a good performance is realized.

Figure 10:
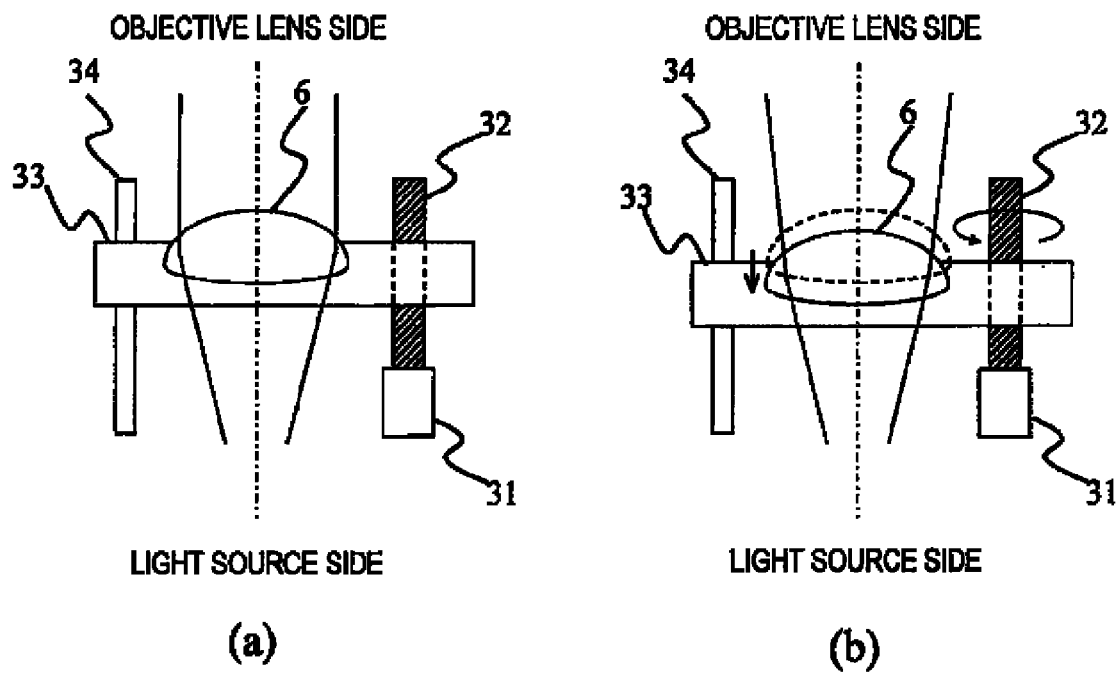
FIGS. 10(a) and (b) each show a schematic structure of a collimator lens 6 and a driving mechanism for driving the collimator lens 6 in an optical axis direction.

Now, with reference to FIG. 10 and FIG. 11, a structure of the collimator lens 6 and elements in the vicinity thereof according to this embodiment will be described in detail.

FIGS. 10(a) and (b) each show a schematic structure of the collimator lens 6 and a driving mechanism for driving the collimator lens 6 in an optical axis direction. In these figures, the light is expanded differently in accordance with the position of the collimator lens 6.

The driving mechanism includes a stepping motor 31, a screw shaft 32, a lens holder 33 and a guide 34.

As shown in FIG. 10(b), by driving the stepping motor 31 to rotate the screw shaft 32, the collimator lens 6 and the lens holder 33 holding the collimator lens 6 are moved in a direction of an optical axis of the collimator lens 6 along the guide 34.

When the stepping motor 31 is used, the position of the collimator lens 6 in the optical axis direction does not need to be monitored. The reason is that the stepping motor 31 rotates at a prescribed stepping unit when being given a pulse signal, and therefore the rotation angle can be accurately controlled by the number of times the pulse signal is given. Accordingly, even without using a positional sensor or the like, the collimator lens 6 can be accurately controlled to be at an arbitrary position in the optical axis direction based on the relationship between the number of times the pulse signal is given and the moving distance. Use of the stepping motor 31 provides an advantage that a structure for monitoring is not necessary and thus the system can be simplified.

Alternatively, the collimator lens 6 may be moved in the optical axis direction by, for example, an actuator driven by a magnetic circuit or a piezoelectric element, or by other structures instead of the stepping motor 31. The actuator driven by a magnetic circuit or a piezoelectric element has a small driving section and has an advantage of being suitable to reduce the size of the optical head.

Figure 11:
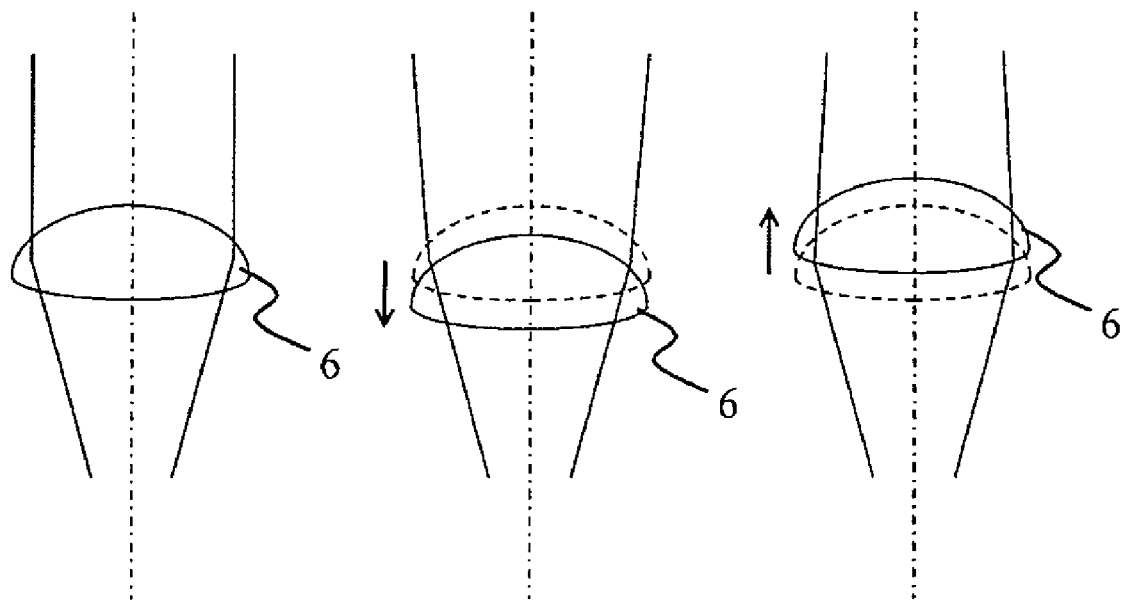
FIG. 11 shows states of a light beam when the collimator lens 6 is driven in the optical axis direction.

FIG. 11 shows states of a light beam when the collimator lens 6 is driven in the optical axis direction. The spherical aberration caused by a difference in the protective substrate thickness of the BD 60 varies the degree of divergence or convergence of the laser light incident on the objective lens 1. This can be corrected by causing a spherical aberration of an opposite polarity to the spherical aberration caused by the difference in the protective substrate thickness.

The state shown in FIG. 11(a), where the light outgoing from the collimator lens 6 is substantially parallel light, is set as a reference state. When, for example, the collimator lens 6 is moved toward the light source from the reference state as shown in FIG. 11(b), the light outgoing from the collimator lens 6 becomes diverging light. Thus, the spherical aberration caused when the protective substrate of the BD 60 is thickened can be corrected.

By contrast, when the collimator lens 6 is moved toward the objective lens as shown in FIG. 11(c), the light outgoing from the collimator lens 6 becomes converging light. Thus, the spherical aberration caused when the protective substrate of the BD 60 is thinned can be corrected.

As described in this embodiment, by locating the relay lens 4 on the opposite side to the collimator lens 6 (i.e., on the light source 2 side) with the dichroic prism 5 being interposed therebetween, the optical magnification for performing recording to or reproduction from the BD 60 and the optical magnification for performing recording to or reproduction from the DVD 70 or the CD 80 can be set to prescribed values, respectively.

For example, in this embodiment, the optical magnification for the BD 60 is set to be about 15× so as to guarantee the required rim intensity while increasing the light utilization efficiency. By contrast, the optical magnification for the DVD 70 and the CD 80 is set to be about 7× in compliance with the specifications of the light receiving/emitting integrated element, which is in wide use for optical heads for DVDs.

In this embodiment, the collimator lens 6 movable in the optical axis direction, which is originally used for correcting the spherical aberration of the BD 60, is commonly used for an optical system of the DVD 70 and the CD 80. Thus, the angle of incidence (diverging/converging degree) of the light beam incident on the coupling lens 8 can be switched. Namely, the light emitting point of the red laser light for performing recording to or reproduction from the DVD 70 and the light emitting point of the infrared laser light for performing recording to or reproduction from the CD 80 can be matched to each other, even when the angle of the light beam incident on the coupling lens 8 (object point position) is different among these two cases. Thus, a light source capable of emitting laser light of two wavelengths can be used.

By matching the light emitting point of the red laser light and the light emitting point of the infrared laser light to each other in this manner, the receiving elements for receiving the respective laser light can be integrated with each other. Namely, the light receiving/emitting integrated element 10 for two wavelengths can be used to simplify the structure of the optical system as in this embodiment. The above-described light receiving/emitting integrated element is widely spread to be used for optical heads and available at low cost. Thus, an optical head can be provided at low cost by using the structure as in this embodiment.

With the designing example of the coupling lens 8 described in this embodiment, a good aberration performance is provided in the case where the blue violet laser light is incident on the coupling lens 8 in the state of substantially parallel light and the red laser light and the infrared laser light are incident on the coupling lens 8 in the state of diverging light. However, whether each type of laser light is to be parallel, converging or diverging when being incident on the coupling lens 8, i.e., the combination of the type of laser light and the type of the state of the light, depends on the design of the coupling lens 8. All the possible combinations are encompassed in the scope of the present invention, needless to say.

For example, a coupling lens may be used which provides a good aberration performance in the case where the red laser light is incident on the coupling lens 8 in the state of substantially parallel light and the infrared laser light is incident on the coupling lens 8 in the state of diverging light.

A coupling lens may be designed so as to provide a good aberration performance in the case where, for example, the infrared laser light is incident on the coupling lens in the state of substantially parallel light or converging light. However, when the infrared laser light is incident on the coupling lens in the state of substantially parallel light or converging light, the position at which the light outgoing from the objective lens is focused is close to the objective lens. As a result, as compared with the case where the light is incident on the coupling lens in the state of diverging light, the working distance (WD) when information is recorded to or reproduced from the CD 80 is shortened. Especially for a recordable CD, the working distance is preferably 0.40 mm or longer. Therefore, the infrared laser light is preferably incident on the coupling lens in the state of diverging light as described in this embodiment.

A coupling lens may also be designed so as to provide a good aberration performance in the case where the blue violet laser light is incident on the coupling lens 8 in the state of converging light or diverging light. However, when a light source for emitting light having a short wavelength as BD and the objective lens 1 having an large NA are used, requirements become more stringent for the aberration caused by the movement of the objective lens 1 or the like and the aberration caused by the relative positional deviation between the objective lens 1 and the coupling lens 8. Therefore, the blue violet laser light is preferably incident on the coupling lens 8 in the state of substantially parallel light.

The NA of the objective lens used for the DVD 70 is smaller than the NA of the objective lens used for the BD 60. Therefore, even when the light is incident in the state of converging light or diverging light, a good aberration performance is easily guaranteed. Even when converging light is incident on the coupling lens, a sufficient working distance is easily guaranteed.

For the above-described reasons, it is preferable to provide an optical structure such that the blue violet laser light for performing recording to or reproduction from the BD 60 is incident on the objective lens in the state of substantially parallel light, the infrared laser light for performing recording to or reproduction from the CD 80 is incident on the objective lens in the state of diverging light, and red laser light for performing recording to or reproduction from the DVD 70 is incident on the objective lens in the state of substantially parallel light, diverging light or converging light.

In the above example, in order to adjust such that the laser light to be incident on the objective lens is in a diverging state or a converging state (i.e., in order to convert the laser light into light of a preferable state), the collimator lens 6 is moved in the optical axis direction. Alternatively, other means is usable.

For example, the lens may be formed of at least one refractive index distribution variable material, so that the focal length of the lens can be varied by applying an electric field, a magnetic field or heat to the refractive index distribution variable material and thus changing the refractive index distribution thereof.

Alternatively, the lens may be formed of a plurality of types of non-miscible liquids having different refractive indices instead of the refractive index distribution variable lens. Application of a voltage corresponding to the wavelength of the laser light can vary the curvature of the interface between the non-miscible liquids. Thus, the degree of divergence or convergence of the laser light (in other words, the focal length of the lens) may be varied.

Conversion of the laser light into diverging light or converging light using the collimator lens 6 of a variable focal length has an advantage of reducing the size of the entire system because the driving section is not provided, as compared with the method of moving the collimator lens in the optical axis direction.

As described above in this embodiment, the wavelength of laser light emitted from the light source varies by, for example, the switching from the reproduction operation to the recording operation (by the switching of the light emitting power) or by a change in the ambient temperature. As the wavelength of the laser light is shorter, the influence exerted by a change in the best image point position is larger. The best image point position is changed by a change in the refractive index of the material of the objective lens, which is caused by a change in the wavelength.

With the combination of the objective lens 1 and the coupling lens 8 in this embodiment, the change in the best (minimum) RMS wavefront aberration at wavelengths of 406 nm and 404 nm is suppressed to about ±0.19 μm from the position of the best (minimum) wavefront aberration at the wavelength of 405 nm. This is realized as follows. The coupling lens 8 in this embodiment includes the first lens 8a which is a concave lens and the second lens 8b which is a convex lens providing a smaller divergence (i.e., having a larger Abbe number) than the first lens face 8a. Therefore, the coupling lens 8 has an effect of correcting, in the opposite direction, the change in the best image point position caused in the objective lens 1, which is a convex lens, by the change in the wavelength. Namely, the coupling lens 8 has an effect of a so-called achromatic lens.

The BD 60, the DVD 70 and the CD 80 are different in the numerical aperture required for recording or reproduction. Accordingly, the aperture restriction element 7 is used to change the diameter of the light beam incident on the coupling lens 8 (objective lens 1). As the aperture restriction element 7, a mechanical aperture or an optical aperture is usable. In an example of the mechanical aperture, a plurality of plates having a hole with a diameter corresponding to the respective numerical aperture are prepared and exchanged. An example of the optical aperture is a wavelength-selective dichroic filter, dichroic prism or the like. The present invention is not limited to these.

As described above, the optical head 20 in this embodiment provides good optical performances regarding light sources for emitting light of three wavelengths, i.e., blue violet laser light, red laser light and infrared laser light, and regarding recording to or reproduction from optical discs corresponding to these wavelengths of laser light. Such an optical head using an objective lens can perform recording to or reproduction from, for example, three types of optical discs of BD, DVD and CD in an excellent manner.

Embodiment 2

Now, with reference to FIG. 12, an optical head 30 according to this embodiment will be described.

Figure 12:
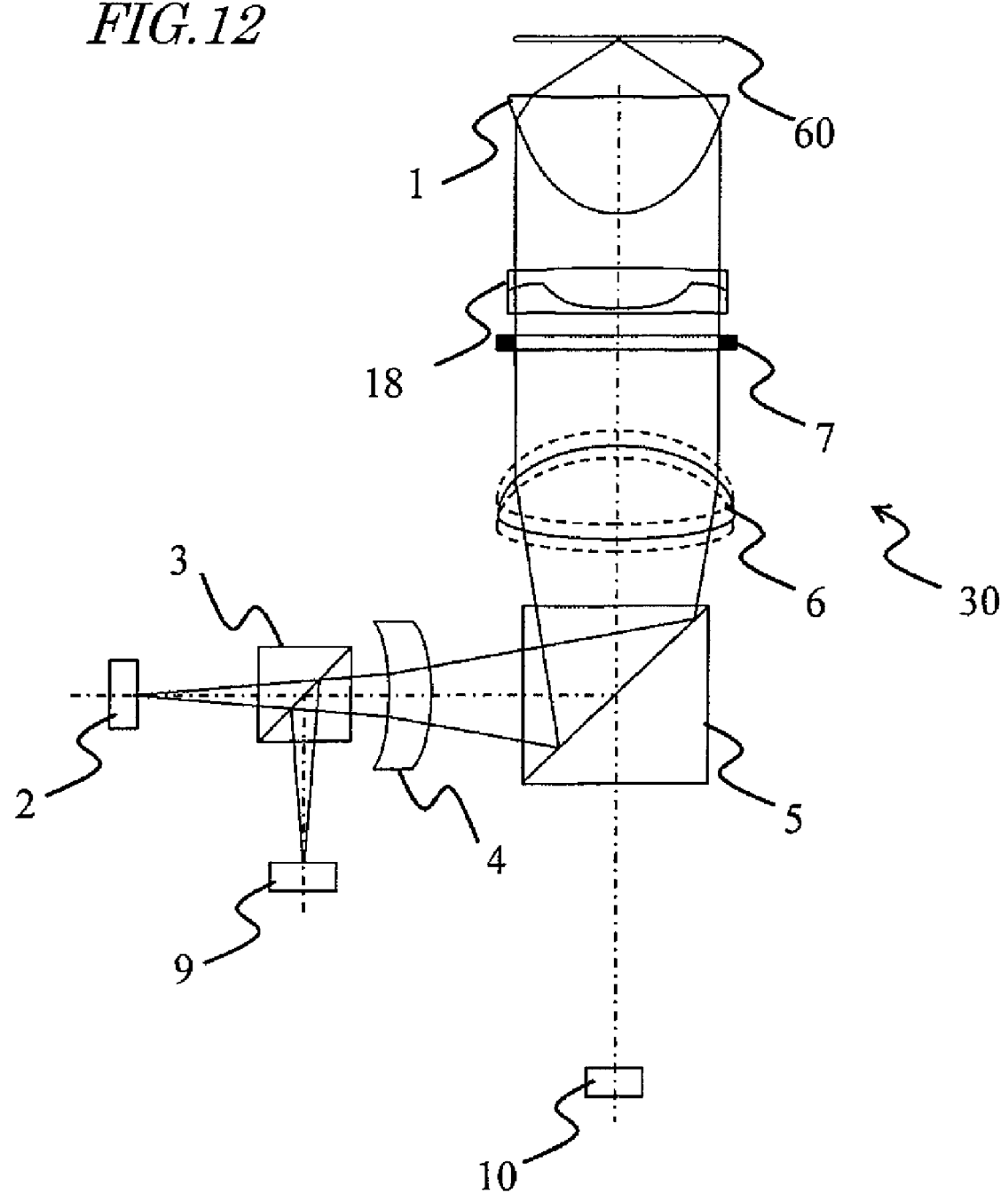
FIG. 12 is a schematic structural view of an optical head 30 according to Embodiment 2.

FIG. 12 is a schematic structural view of an optical head 30 according to this embodiment. The optical head 30 shown in FIG. 12 is different from the optical head 20 according to Embodiment 1 in the structure of the coupling lens. The other elements are identical between the optical head 20 and the optical head 30, and bear the identical reference numerals and descriptions thereof will be omitted.

Figure 13:
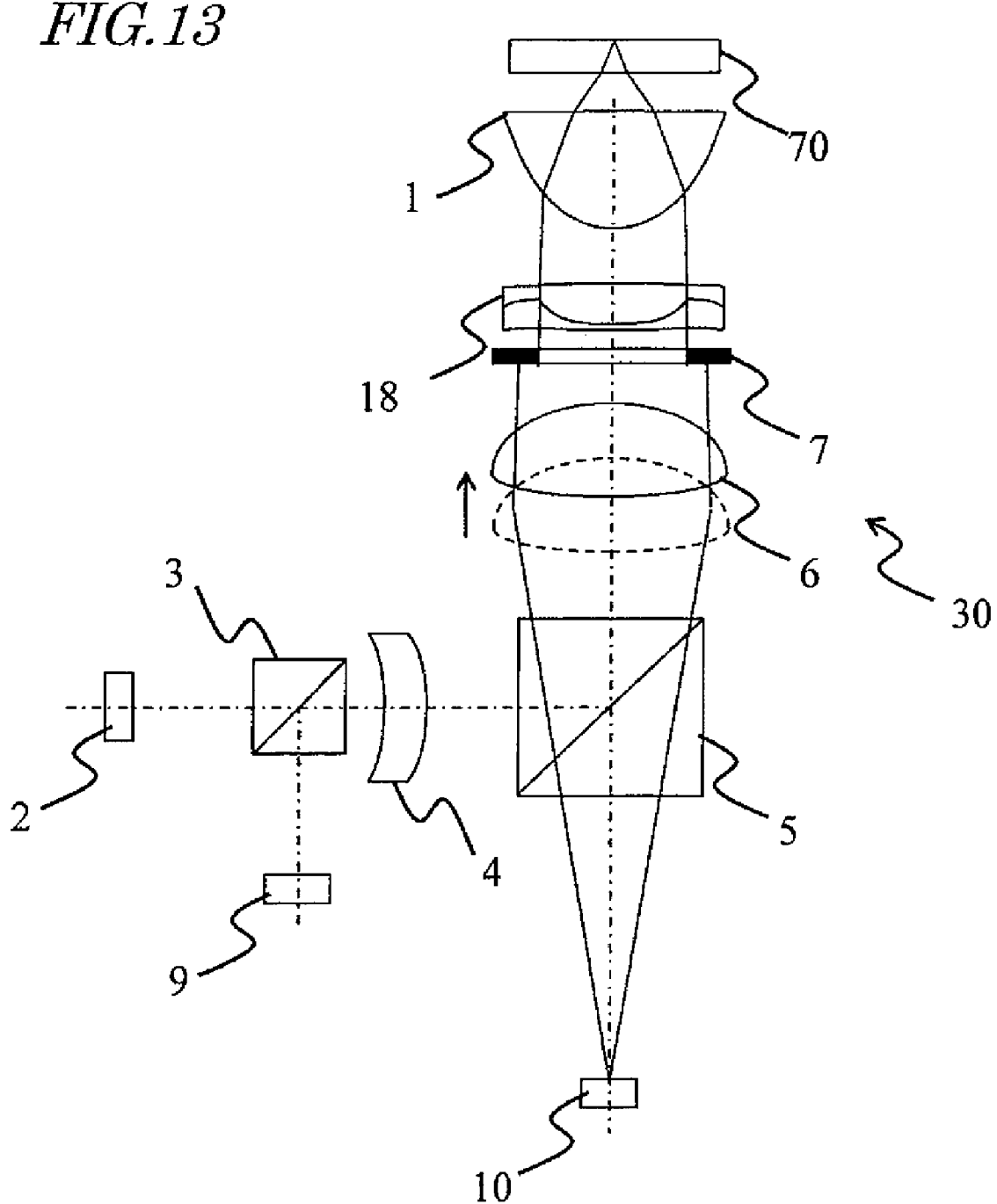
FIG. 13 shows a state of an optical path in the optical head 30 when the optical disc is a DVD 70.
Figure 14:
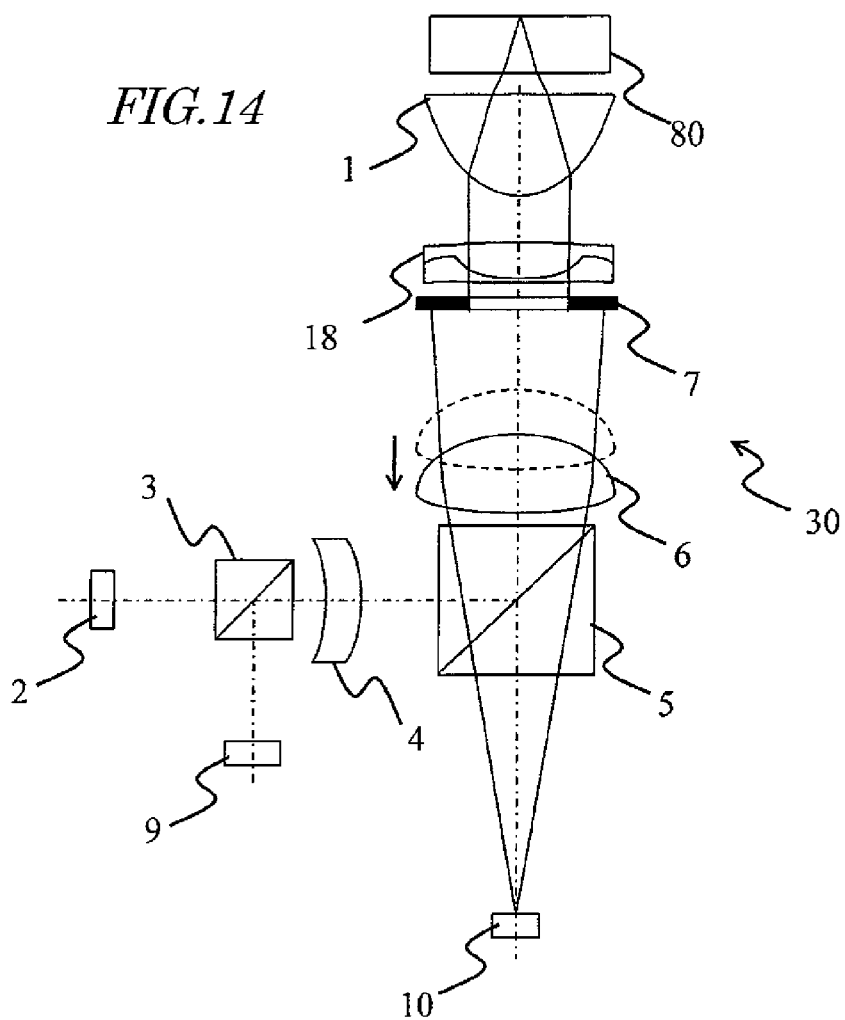
FIG. 14 shows a state of an optical path in the optical head 30 when the optical disc is a CD 80.

FIG. 12 shows a state of an optical path in the optical head 30 when the optical disc is the BD 60. FIG. 13 shows a state of an optical path in the optical head 30 when the optical disc is the DVD 70. FIG. 14 shows a state of an optical path in the optical head 30 when the optical disc is the CD 80.

From FIG. 12 through FIG. 14, it is understood that the diameter of the laser light passing a coupling lens 18 is different among these cases. As a result, the blue violet laser light, the red laser light and the infrared laser light receive different optical actions when passing the coupling lens 18.

Now, with reference to FIG. 15 through FIG. 20, the coupling lens 18 according to this embodiment will be described in detail.

Figure 15:
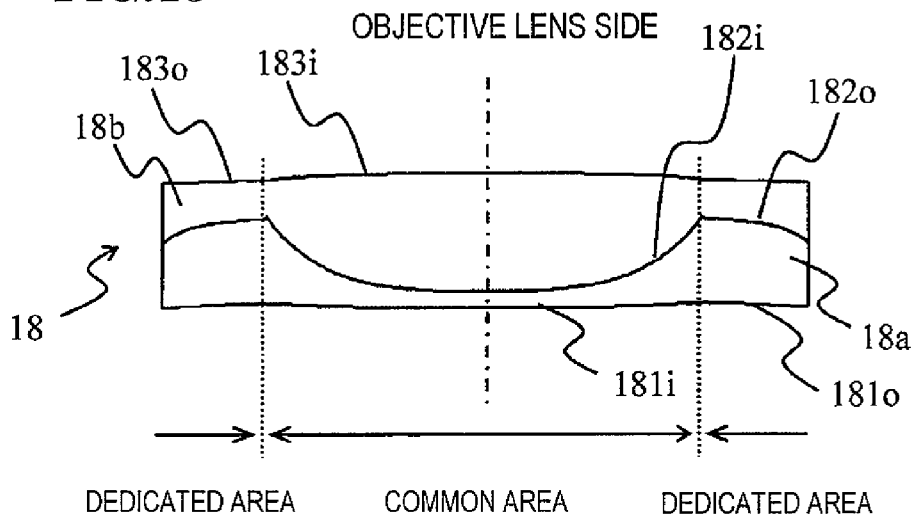
FIG. 15 is a schematic structural view of a coupling lens 18 according to Embodiment 2.
Figure 16:
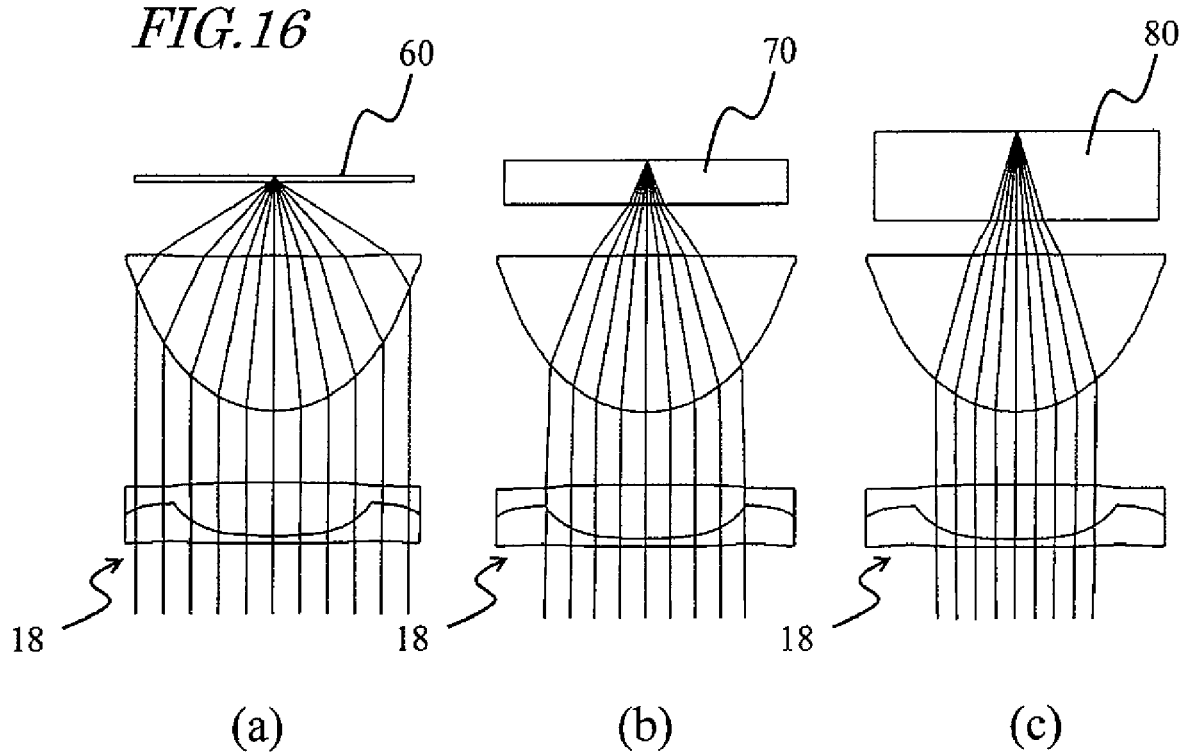
FIGS. 16(a) through (c) each show a state of a light beam when laser light is focused on an information recording layer of each of the BD 60, the DVD 70 and the CD 80 using the coupling lens 8 and an objective lens 1 according to Embodiment 2.

FIG. 15 is a schematic structural view of the coupling lens 18. The coupling lens 18 includes a first lens 18a and a second lens 18b. When mounted on the optical head 30, the first lens 18a is directed toward the collimator lens 6 and the second lens 18b is directed toward the objective lens 1.

The first lens 18a and the second lens 18b each have a common area for three wavelengths, which encompasses an optical axis, and a dedicated area for the blue violet wavelength, which is outer to the common area.

In this embodiment, three lens faces of the coupling lens 18 which cross the optical axis are defined.

A first face, which is a face of the first lens 18a on the collimator lens 6 side, is divided into a common area 181i and a dedicated area 181o. A second face or a close contact face, which is a face of the first lens 18a on the objective lens 1 side (in other words, a face of the second lens 18b on the collimator lens 6 side) is divided into a common area 182i and a dedicated area 182o. A third face, which is a face of the second lens 18b on the objective lens 1 side, is divided into a common area 183i and a dedicated area 183o.

The first lens 18a and the second lens 18b are cemented or bonded in close contact or substantially close contact with each other. The face of the first lens 18a which is cemented or bonded to the second lens 18b, and the face of the second lens 18b which is cemented or bonded to the first lens 18a, have the same or substantially the same aspheric shape. The first lens 8a and the second lens 8b, which are molded separately, can be held in substantially close contact by being inserted into a prescribed holder.

In this embodiment, the first lens 18a is molded of a resin material (for example, polycarbonate) and the second lens 18b is molded of a glass material (for example, PBK40). Thus, the first lens 18a of a resin material can be molded in close contact with the second lens 18b of a glass material. Therefore, the positional alignment of the first lens 18a and the second lens 18b at the close contact face is substantially unnecessary.

In order to mold the lenses in close contact, the resin material for the first lens 18a needs to have a glass transition temperature which is lower than that of the glass material used for the second lens 18b. For example, the glass transition temperature of general glass materials for optical uses is 500° C. Therefore, it is preferable that the glass transition temperature of the resin material for the first lens 18a is 300° C. or lower.

In the coupling lens 18 in this embodiment, the second lens 18b is molded of a glass material PBK40 having superb optical performances. The molding of the glass material PBK40 can be performed at low cost using a mold. The first lens 18a is formed of polycarbonate, which is a resin material, and can also be molded at low cost. Since the glass transition temperature of polycarbonate used for the first lens 18a is 138° C. and the glass transition temperature of PBK used for the second lens 18b is 501° C., the first lens 18a can be molded in close contact with the second lens 18b which has been molded.

It is preferable that the resin material for the first lens 18a has a property of contacting the second lens 18b highly closely and is superb in transmittance, light resistance and moisture resistance.

In the case where the first lens 18a and the second lens 18b are formed of different glass materials, there is a feature that the obtained lens is very high in light resistance and moisture resistance. The first lens 18a can be molded of a different glass material from that of the second lens 18b as long as there is a certain degree of difference between the glass transition temperature of the first lens 18a and the glass transition temperature of the second lens 18b. The difference in the glass transition temperature is preferably 200° C. or greater. When the first lens 18a and the second lens 18b formed of different glass materials are used, it is desirable that the first lens 18a and the second lens 18b are bonded with an adhesive.

Alternatively, the first lens 18a may be molded in contact with the second lens 18b by a so-called photopolymer method (2P method) using a ultraviolet curable resin. By molding the first lens 18a by the photopolymer method, the positional alignment of the first lens 18a and the second lens 18b is made unnecessary.

In the above example and an example described below specifically, the first lens 18a is molded in close contact with the second lens 18b which has been molded. The same effect is provided even when the first lens 18a and the second lens 18b are switched. For example, the first lens 18a may be molded of a glass material and the second lens 18b may be molded of a resin material.

Hereinafter, an example will be described in detail in which polycarbonate (nd=1.584; vd=30.1) is used as the material for the first lens 18a, and PBK40 (nd=1.518; vd=63.5) is used as the material for the second lens 18b.

The aspheric shape of the first face 181i, 181o, the aspheric shape of the second face 182i, 182o, and the aspheric shape of the third face 183i, 183o are determined by the aspheric shape represented by expression (1) above.

In expression (1), h is the distance from the apex on the optical axis in a direction perpendicular to the optical axis, R is the radius of curvature, k is the conic constant, and Ai is the aspheric coefficient where i=0th to 8th term. Note that the 0th term is included. Z is determined by h, R, k and Ai, and is the distance (sag) from the tangent plane of the apex in the optical axis direction. The curve determined by the value of Z gives the aspheric cross-sectional shape of each of the faces.

$A_0 h^0$, which is the zeroth-order term, i.e., $A_0$ represents the shift amount of sag in the optical axis direction. Although it is not common to use the zeroth-order term in expression (1) for giving an aspheric shape, the zeroth-order term is treated as one of the aspheric coefficients like the aspheric coefficients of the other terms.

Tables 4 through 6 show the specifications of the coupling lens 18.

TABLE 4

| Face No. | Radius of curvature | Face separation | Material |
|---|---|---|---|
| 1 | (R) | 0.10 | Polycarbonate |
| 2 | (R) | 0.75 | PBK40 |
| 3 | (R) | — | — |

TABLE 5

Aspheric coefficient of the coupling lens

| Lens face | First face | | Second (border) face | | Third face | |
|---|---|---|---|---|---|---|
| | Common area | Dedicated area | Common area | Dedicated area | Common area | Dedicated area |
| Diameter | 2.86 | — | 2.84 | — | 2.88 | — |
| R | −1.377848E+02 | −7.497696E+01 | 8.689889E+00 | −9.662039E−02 | −3.585451E+01 | −7.336921E+01 |
| k | −4.755777E+03 | −1.105136E+03 | 3.103830E+01 | −1.927899E+05 | −1.236132E+03 | 4.993872E+02 |
| A0 | 0.000000E+00 | 4.000000E−02 | 0.000000E+00 | 4.900000E−01 | 0.000000E+00 | −3.215000E−02 |
| A1 | 0.000000E+00 | 0.000000E+00 | 0.000000E+00 | 0.000000E+00 | 0.000000E+00 | 0.000000E+00 |
| A2 | 9.779752E−03 | −1.330156E−04 | 4.998982E−02 | −7.025707E−03 | −5.455447E−04 | 2.505305E−04 |
| A3 | 1.359560E−03 | −1.544251E−05 | 1.947803E−02 | −1.109245E−03 | −9.351682E−04 | 8.327718E−05 |
| A4 | −2.833996E−04 | −3.819420E−05 | 7.139013E−04 | 9.77497E−04 | −6.119682E−04 | 5.588720E−07 |
| A5 | −3.452001E−04 | −1.380898E−05 | −1.478104E−03 | −7.893298E−05 | −1.009399E−04 | −1.106165E−05 |
| A6 | −1.345624E−04 | 9.535750E−07 | −9.430643E−04 | −1.916721E−05 | 1.850666E−05 | −3.290850E−06 |
| A7 | 9.805895E−06 | 2.946026E−07 | −2.334123E−04 | −2.616084E−06 | −5.595202E−06 | −1.353794E−06 |
| A8 | 1.279059E−05 | 9.286240E−09 | 2.770767E−04 | 1.286522E−07 | −1.723416E−05 | 6.163810E−07 |
| A9 | 0.000000E+00 | 7.160655E−09 | 0.000000E+00 | 5.907250E−09 | 0.000000E+00 | 3.751828E−09 |
| A10 | 0.000000E+00 | 1.284297E−09 | 0.000000E+00 | 5.465395E−09 | 0.000000E+00 | 1.663208E−09 |

TABLE 6

Used wavelength, material refractive index, separation

| | | | | |
|---|---|---|---|---|
| Wavelength | [nm] | 405 | 655 | 785 |
| Synthesized focal length | [mm] | 2.28 | 2.35 | 2.37 |
| Refractive index of first lens | | 1.61736 | 1.57849 | 1.57203 |
| Refractive index of second lens | | 1.53112 | 1.51513 | 1.51180 |
| Numerical aperture | | 0.85 | 0.6 | 0.47 |
| Aperture diameter | [mm] | 3.899 | 2.76 | 2.27 |
| Object point distance | [mm] | ∞ | −120 | 60 |
| Working distance | [mm] | 0.993 | 0.668 | 0.438 |
| Protective substrate thickness | [mm] | 0.0875 | 0.6 | 1.2 |

In Table 4, the face numbers are allocated as follows. Face number 1 represents the first face 181i, 181o, face 2 represents the second face 182i, 182o, and face number 3 represents the third face 183i, 183o. Given as the face separation and the material are the separation, and the material filling the separation, between the face represented by the respective face number and the face represented by the next face number.

In Table 5, "E+05" to "E-09" respectively represent $10^5$ to $10^{-9}$.

The objective lens 1 used in combination with the coupling lens 18 is an objective lens having a focal length of 2.3 mm dedicated for the BD 60 as in Embodiment 1. With the objective lens 1, the spherical aberration becomes substantially zero when parallel light having a wavelength of 405 nm is incident on the BD 60 having a protective substrate thickness of 0.0875 mm.

The object point distance in Table 6 indicates that for performing recording to or reproduction from the BD 60, light of an afocal object point distance, namely, parallel light is incident; for performing recording to or reproduction from the DVD 70, converging light of an object point distance of −120 mm is incident; for performing recording to or reproduction from the CD 80, diverging light of an object point distance of +60 mm is incident.

FIGS. 16(a) through (c) each show a state of a light beam when laser light is focused on an information recording layer of each of the BD 60, the DVD 70 and the CD 80 using the coupling lens 18 and the objective lens 1 according to this embodiment. For recording or reproducing information, the light beam assumes the state shown in each figure.

FIG. 16(a) shows the state of the light beam when laser light having a wavelength of 405 nm is collected with an NA of 0.85 and focused on the BD 60 having a protective substrate thickness of 0.0875 mm. Similarly, FIG. 16(b) shows the state of the light beam when laser light having a wavelength of 655 nm is collected with an NA of 0.60 and focused on the DVD 70 having a protective layer thickness of 0.6 mm. FIG. 16(c) shows the state of the light beam when laser light having a wavelength of 785 nm is collected with an NA of 0.47 and focused on the CD 80 having a protective layer thickness of 1.2 mm. All the figures show the states while information is being recorded or reproduced.

According to FIGS. 16(a) through (c), the blue violet laser light passes both the dedicated area and the common area of the coupling lens 18, whereas the red laser light and the infrared laser light pass only the common area.

Figure 18:
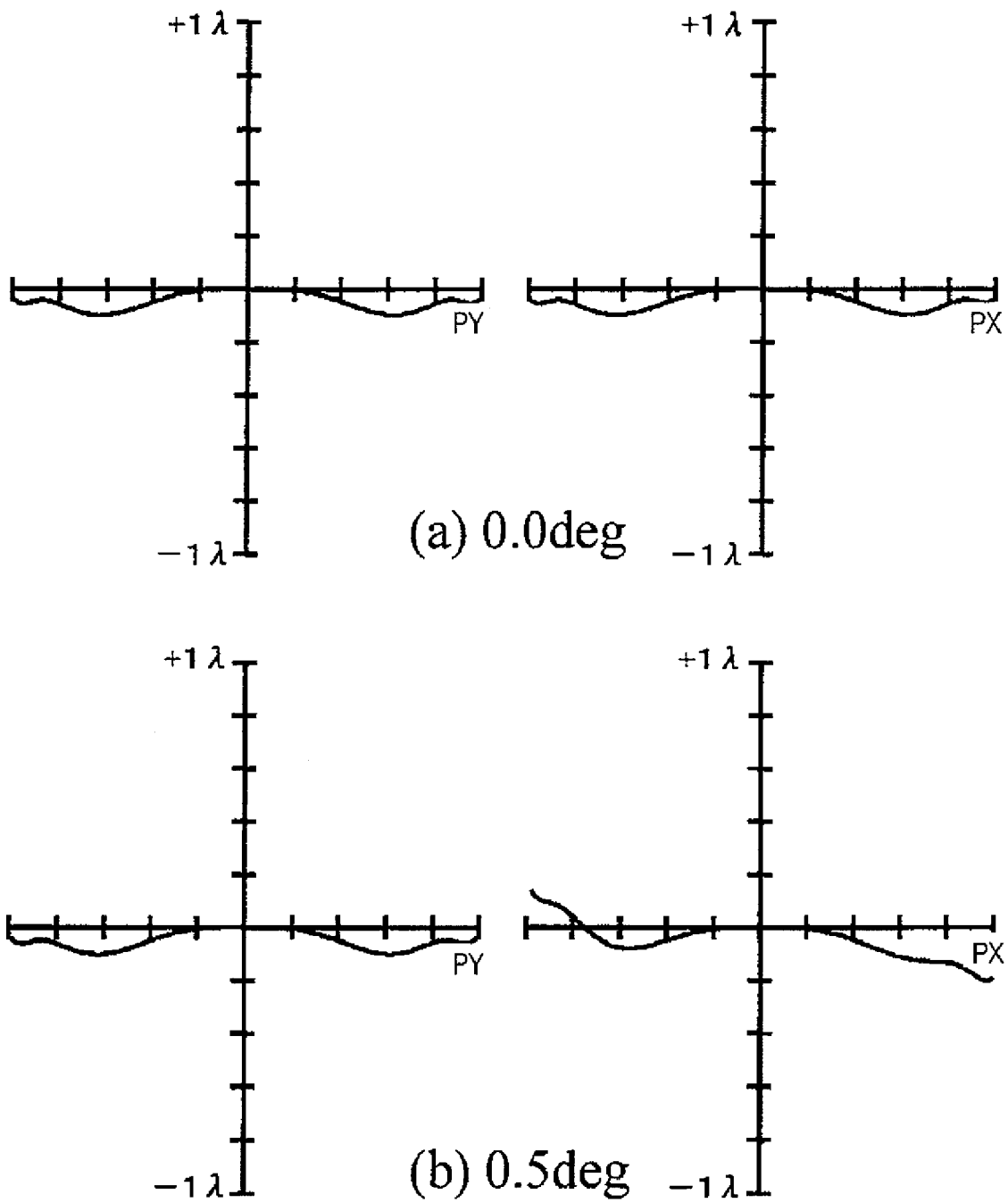
FIG. 18 shows wavefront aberration diagrams obtained when laser light having a wavelength of 655 nm is focused on the DVD 70.
Figure 19:
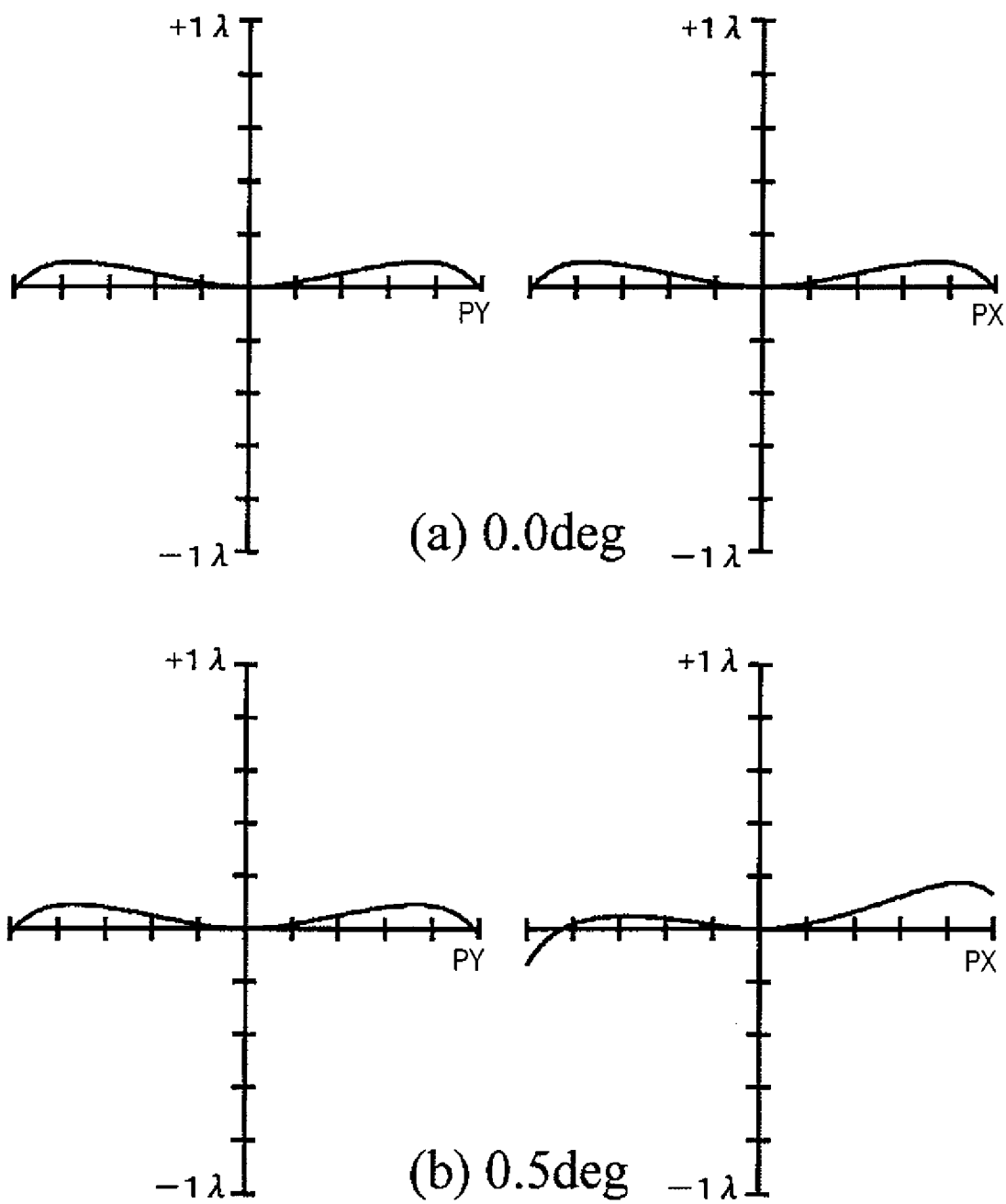
FIG. 19 shows wavefront aberration diagrams obtained when laser light having a wavelength of 785 nm is focused on the CD 80.

FIG. 17 shows wavefront aberration diagrams obtained when the laser light having a wavelength of 405 nm is focused on the BD 60 at the angle of incidence of 0.0 deg ((a)) and 0.5 deg ((b)). Similarly, FIG. 18 shows wavefront aberration diagrams obtained when the laser light having a wavelength of 655 nm is focused on the DVD 70. FIG. 19 shows wavefront aberration diagrams obtained when the laser light having a wavelength of 785 nm is focused on the CD 80.

PX axis and PY axis shown in FIG. 17 through FIG. 19 are perpendicular to the optical axis, and PX axis is perpendicular to PY axis. The vertical axis represents the wavefront aberration. The minimum value of the scale is −1λ whereas the maximum value of the scale is +1λ (λ: wavelength). As shown in FIG. 17 through FIG. 19, it has been confirmed that even when the angle of incidence of the laser light is varied from 0.0 deg to 0.5 deg, the values of the wavefront aberration are within ±1λ.

Figure 20:
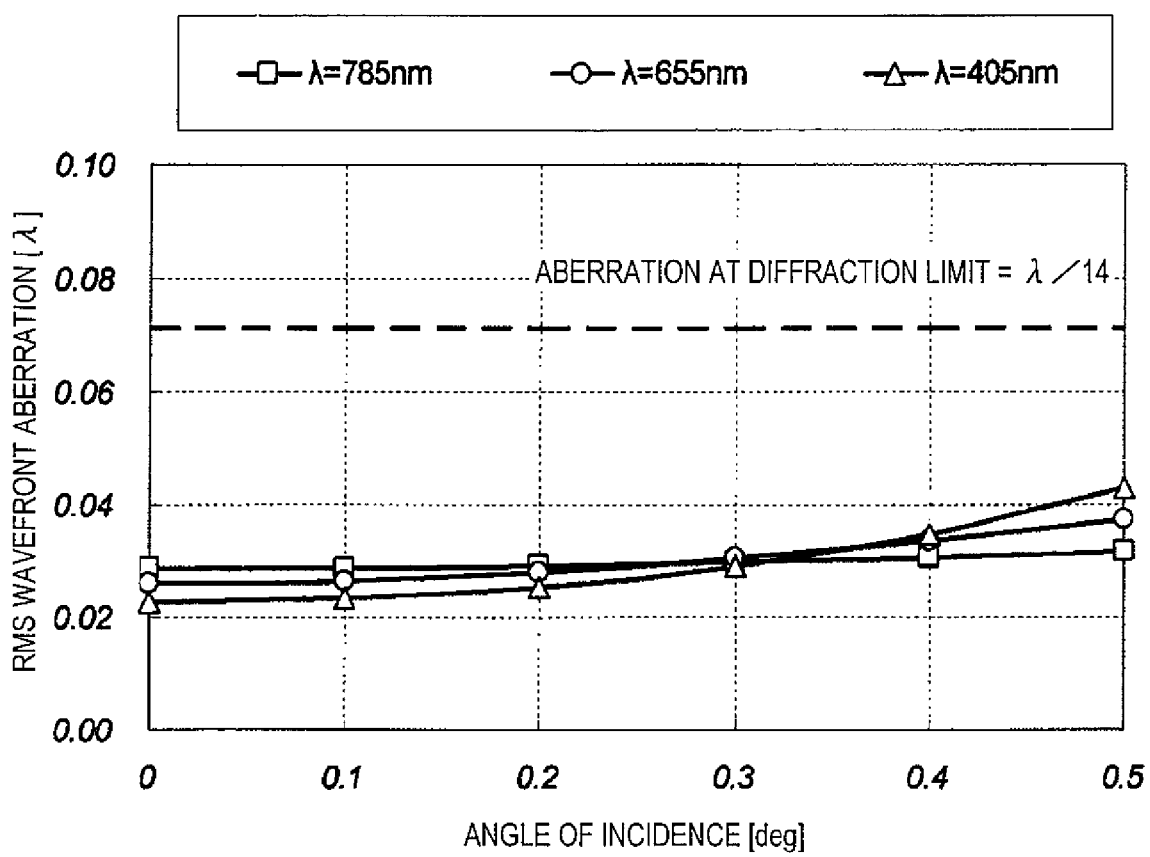
FIG. 20 is an RMS wavefront aberration diagram in which the horizontal axis represents the angle of incidence.

FIG. 20 is an RMS wavefront aberration diagram in which the horizontal axis represents the angle of incidence.

FIG. 20 shows RMS wavefront aberrations in the case where the light having a wavelength of 405 nm is focused on the BD 60, in the case where the light having a wavelength of 655 nm is focused on the DVD 70, and in the case where the light having a wavelength of 785 nm is focused on the CD 80.

According to FIG. 20, in any of the cases, all the values of the RMS wavefront aberrations are equal or lower than the diffraction limit of 0.07% (λ/14) when the angle of incidence is 0.0 deg to 0.5 deg. This means that a good performance is realized.

With the designing example of the coupling lens 18 described in this embodiment, a good aberration performance is provided in the case where the blue violet laser light is incident on the coupling lens 18 in the state of substantially parallel light and the red laser light and the infrared laser light are incident on the coupling lens 18 in the state of diverging light. However, whether each type of laser light is to be parallel, converging or diverging when being incident on the coupling lens 18, i.e., the combination of the type of laser light and the type of the state of the light, depends on the design of the coupling lens 18. All the possible combinations are encompassed in the scope of the present invention, needless to say.

With the combination of the objective lens 1 and the coupling lens 18 in this embodiment, the change in the best (minimum) RMS wavefront aberration at wavelengths of 406 nm and 404 nm is suppressed to about ±0.4 μm from the position of the best (minimum) wavefront aberration at the wavelength of 405 nm. This is realized by the following. The coupling lens 18 in this embodiment includes the first lens 18a which is a concave lens and the second lens 18b which is a convex lens providing a smaller divergence (i.e., having a larger Abbe number) than the first lens 18a. Therefore, the change in the best image point position caused in the objective lens 1, which is a convex lens, by the change in the wavelength is corrected in the opposite direction by the coupling lens 18.

In order to further improve the recording or reproduction performances on a recordable high density optical disc, it is preferable to further provide a chromatic aberration correction element for correcting a change in the best image point position caused by a change in the wavelength. As the chromatic aberration correction element, a diffraction type element may be separately inserted on the optical path or an achromatic lens obtained by bonding collimator lenses may be used.

FIGS. 21(a) through (d) are each a wavefront aberration diagram obtained when the blue violet laser light is focused on the BD 60. PX axis is perpendicular to the optical axis. The vertical axis represents the wavefront aberration. The minimum value of the scale is −1λ whereas the maximum value of the scale is +1λ.

Figure 21:
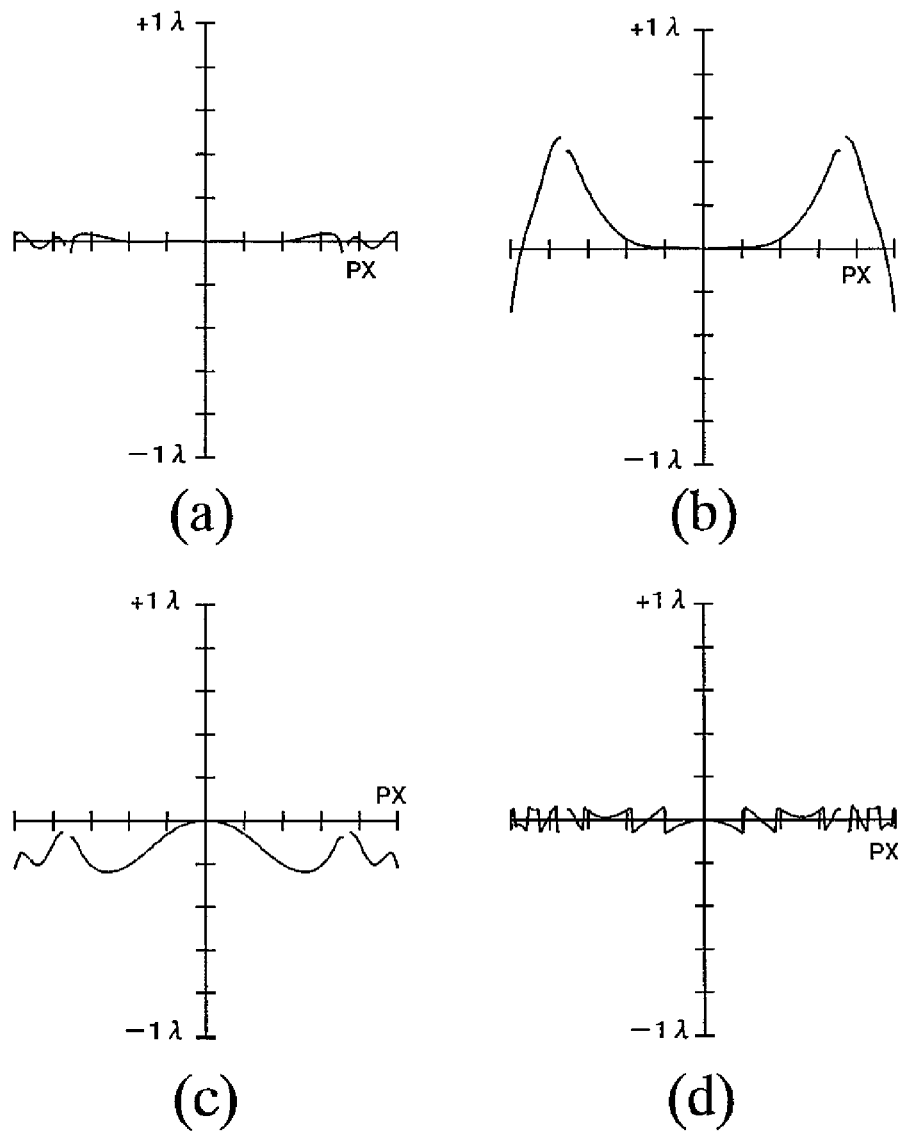
FIGS. 21(a) through (d) are each a wavefront aberration diagram obtained when blue violet laser light is focused on the BD 60.

FIG. 21(a) is a wavefront aberration diagram obtained when laser light having a wavelength of 405 nm, which is a designing wavelength, is focused on the BD 60. The wavefront aberrations show a good characteristic.

FIG. 21(b) is a wavefront aberration diagram obtained when laser light having a wavelength of 410 nm, which is deviated from the designing wavelength, is focused on the BD 60. According to FIG. 21(b), higher-order spherical aberrations occur in addition to the third-order spherical aberrations. The third-order spherical aberrations can be corrected by moving the collimator lens 6 toward the light source and thus allowing divergent light to be incident on the coupling lens 18. FIG. 21(c) is a wavefront aberration diagram corrected by the movement of the collimator lens 6.

However, the fifth- or higher-order spherical aberrations remaining in FIG. 21(c) cannot be corrected by moving the collimator lens 6.

Figure 22:
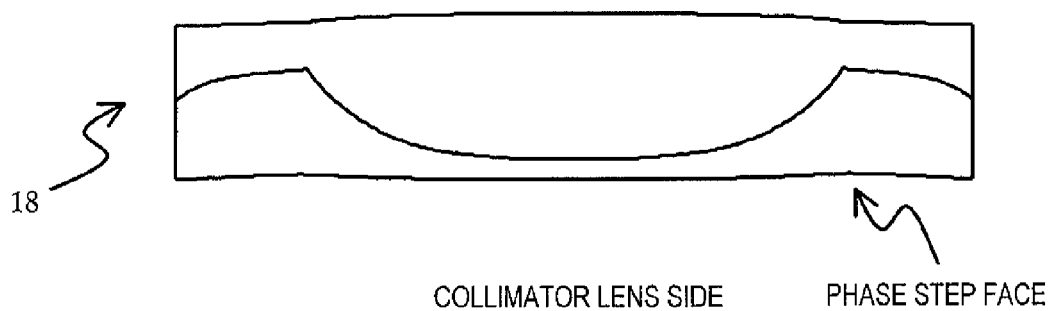
FIG. 22 shows a coupling lens 18 having a phase step.

Such higher-order spherical aberrations caused by the change in the wavelength can be corrected using a phase step. In this embodiment, as shown in FIG. 22, a phase step is formed in superposition on the aspheric shaped first face of the coupling lens 18 (the face on the collimator lens side).

Figure 23:
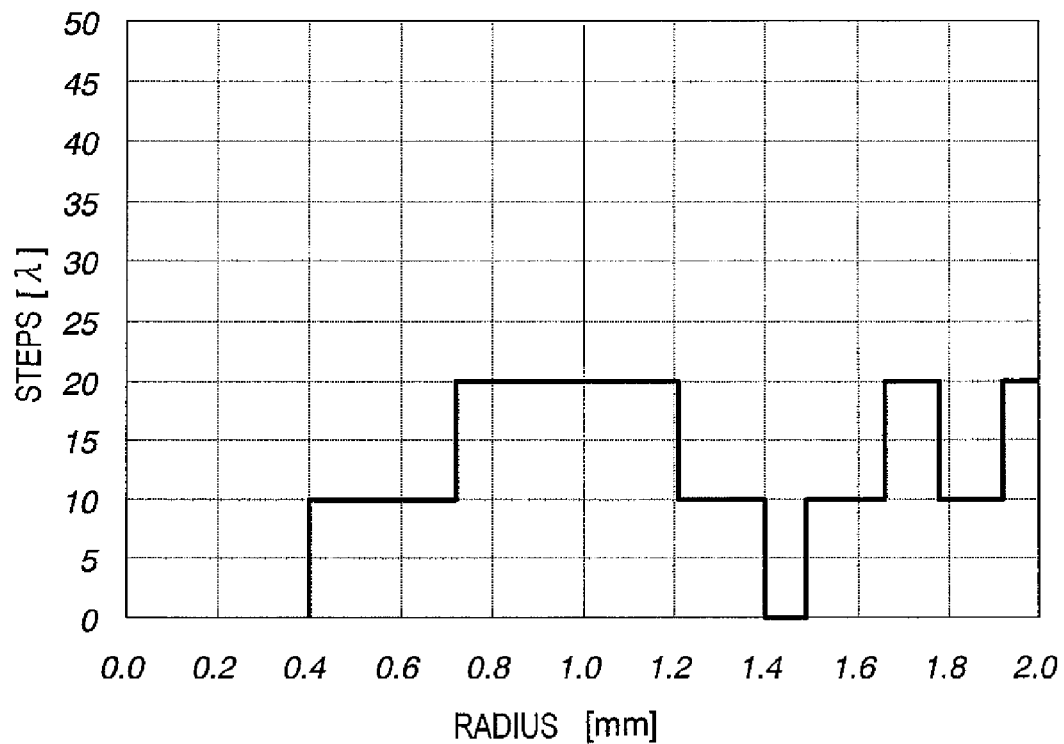
FIG. 23 shows a cross-sectional shape of the phase step provided by faces perpendicular to the optical axis.

FIG. 23 shows a cross-sectional shape of the phase step along the planes perpendicular to the optical axis.

In FIG. 23, the horizontal axis represents the radius of the coupling lens 18. The vertical axis represents a phase shift amount caused by the phase step at each radial position. The phase shift amount is represented with the integer by which the wavelength $\lambda$ is multiplied, where $1\lambda$ is the designing wavelength of 405 nm. As shown in FIG. 23, by providing a phase step of integral multiples of $1\lambda$, higher-order spherical aberrations can be generated in accordance with the change in the wavelength of the blue violet laser light without influencing the wavefront of the red laser light (wavelength: 655 nm) or of the infrared laser light (wavelength: 785 nm). The wavefront corrected by the phase step has a shape shown in FIG. 21(d).

As described above, regarding the spherical aberrations caused by a change in the wavelength, third-order spherical aberrations can be corrected by moving the collimator lens 6 and also higher-order spherical aberrations can be corrected by using a phase step.

A phase step may be located in the optical path as an independent optical element, but alternatively, may be formed in a face of the coupling lens 18 as in this embodiment. In this case, the number of parts can be reduced, which is preferable in terms of size reduction and cost reduction. The same effect is provided when the phase step is formed in the third face of the coupling lens 18 (the face on the objective lens side). Considering that the phase step is formed by molding in superposition on an aspheric shaped face, it is preferable to form the phase step on the lens formed of a resin (the first lens of polycarbonate in this embodiment) from the viewpoint of creating a mold.

When the coupling lens 8 described in Embodiment 1 is used, most of the spherical aberrations caused by a change in the wavelength are third-order spherical aberrations. Accordingly, such spherical aberrations caused by the change in the wavelength can be corrected only by moving the collimator lens 6 and thus a phase step is substantially unnecessary.

As described above, the optical head 30 in this embodiment provides good optical performances regarding light sources for emitting light of three wavelengths, i.e., blue violet laser light, red laser light and infrared laser light, and regarding recording to or reproduction from optical discs corresponding to these wavelengths of laser light. Such an optical head using an objective lens can perform recording to or reproduction from, for example, three types of optical discs of BD, DVD and CD in an excellent manner.

The optical head 20 in Embodiment 1 and the optical head 30 in Embodiment 2 are both structured so as to emit blue violet laser light having a wavelength of 405 nm from the light source 2 and separately emit red laser light having a wavelength of 655 nm and infrared laser light having a wavelength of 785 nm from the light receiving/emitting integrated element 10. The present invention is not limited to such a structure. For example, the blue violet laser light, the red laser light and the infrared laser light may be emitted from light sources located at different positions. The light receiving element 9 is located at a different position from the light source 2, but alternatively, the light receiving element 9 and the light source 2 may be located at the same position as a light receiving/emitting integrated element. The light receiving/emitting integrated element 10 receive both the red laser light and the infrared laser light, but alternatively, the red laser light and the infrared laser light may be received by different light receiving elements. A three-wavelength light source having light sources for the blue violet laser light, the red laser light and the infrared laser light integrated together may be used. The blue violet laser light, the red laser light and the infrared laser light may be received by an integral light receiving element.

With the optical head 20 in Embodiment 1 and the optical head 30 in Embodiment 2, laser light having a wavelength of 405 nm is used to perform recording to or reproduction from the BD 60, laser light having a wavelength of 655 nm is used to perform recording to or reproduction from the DVD 70, and laser light having a wavelength of 785 nm is used to perform recording to or reproduction from the CD 80. However, the present invention is widely applicable to optical heads for performing recording to or reproduction from three types of optical discs using laser light having a wavelength of 350 to 450 nm, laser light having a wavelength of 600 to 700 nm and laser light having a wavelength of 750 to 850 nm.

The coupling lens 8 in Embodiment 1 and the coupling lens 18 in Embodiment 2 are usable in an optical system for performing information recording to or information reproduction from three types of optical discs of BD, DVD and CD. These coupling lens are also usable in an optical system for performing information recording to or information reproduction from three types of optical discs of another high density optical disc (protective substrate thickness: 0.6 mm; NA: 0.65), DVD and CD, needless to say.

Embodiment 3

Figure 24:
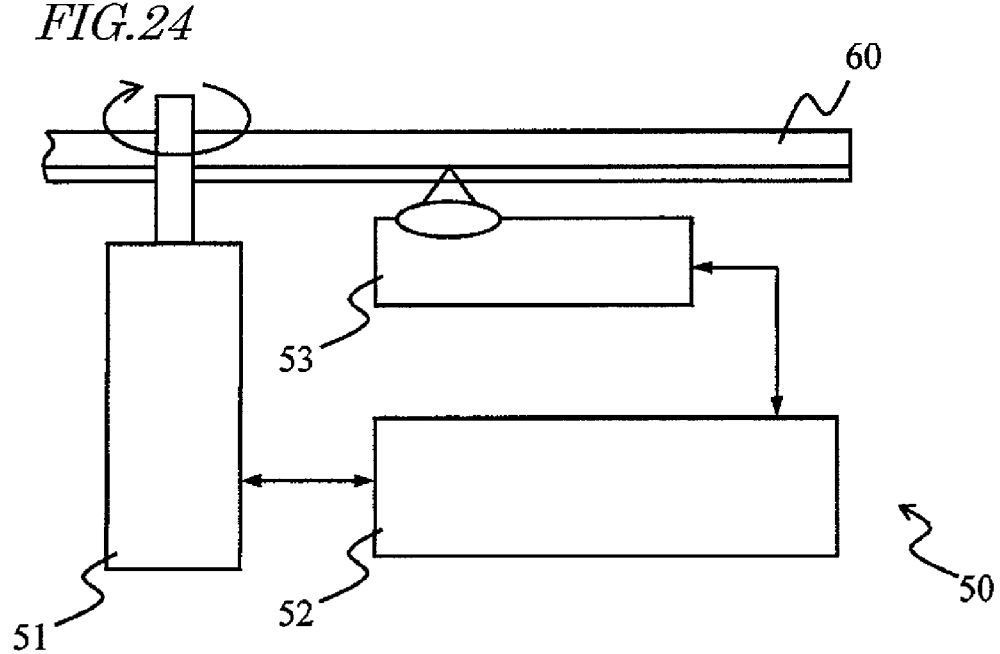
FIG. 24 is a schematic structural view of an optical disc apparatus according to Embodiment 3.
Figure 25:
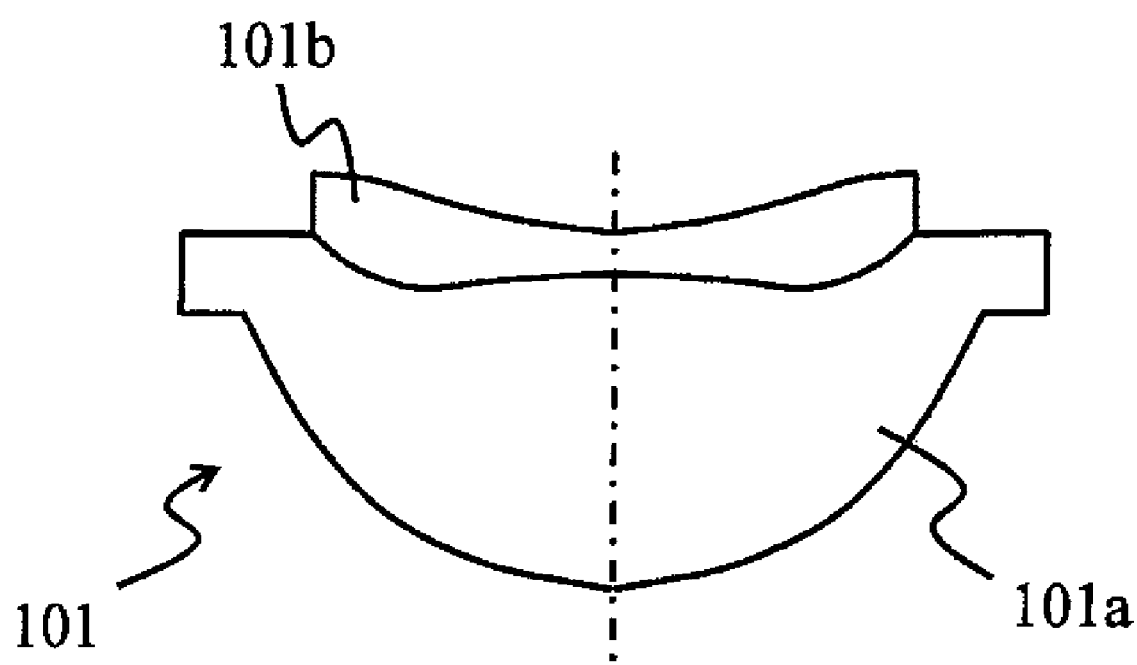
FIG. 25 shows a structure of a conventional objective lens 101.

FIG. 24 is a schematic structural view of an optical disc apparatus 50 according to this embodiment.

The optical disc apparatus 50 includes an optical head driving section 51, a control section 52, and an optical head 53. FIG. 24 shows the BD 60 mounted on the optical disc apparatus 50 for the sake of illustration. Needless to say, the BD 60 may be replaced with the DVD 70 or the CD 80. The BD 60, the DVD 70 and the CD 80 are dismountable from the optical disc apparatus 50 and are not elements thereof. The following description will be given with an assumption that the BD 60 is provided as the optical disc, unless otherwise specified.

The optical disc driving section 51 is a motor for driving the BD 60 to rotate.

The optical head 53 is an optical head according to Embodiment 1 or 2.

The control section 52 is a so-called optical disc controller, and drives and controls the optical disc driving section 51 and the optical head 53. The control section 52 processes a control signal and an information signal received by the optical head 53 and causes the information signal to interface between the elements of the optical disc apparatus 50 and an external device (for example, a host computer).

The optical disc apparatus 50 in this embodiment has one of the optical heads described in Embodiments 1 and 2, and therefore can perform recording or reproduction in an excellent manner regarding a plurality of light sources and optical discs corresponding thereto.

INDUSTRIAL APPLICABILITY

An optical head according to the present invention is capable of performing recording to or reproduction from a high density optical disc, a DVD and a CD. Therefore, the structure of the optical head is simplified and the productivity thereof is improved. In addition, the optical disc apparatus itself can be reduced in size and weight, can operate more precisely, and can be provided at lower cost.

The invention claimed is:

1. A coupling lens incorporatable into an optical head for collecting laser light emitted from a plurality of light sources and having different wavelengths on an information recording layer of different types of optical information recording mediums respectively,
the coupling lens comprising a first lens and a second lens which are substantially in close contact with each other such that optical axes thereof match each other and designed such that the laser light having different wavelengths are refracted by the close contact face, and also including three lens faces crossing the optical axis; wherein:
the three lens faces are:
a first lens face, which is a face of the first lens which is not in contact with the second lens,
a second lens face, which is a contact face of the first lens and the second lens which are substantially in close contact with each other, and
a third lens face, which is a face of the second lens which is not in contact with the first lens;
at least one of the first lens face, the second lens face and the third lens face is formed to have an aspheric shape;
in an effective area of at least one of the first lens face, the second lens face and the third lens face, a first effective area encompassing the optical axis and a second effective area located outside the first area are formed to have different aspheric shapes; and
the coupling lens is afocal for the shortest wavelength among the different wavelengths of the laser light.

2. The coupling lens according to claim 1, wherein regarding the effective area of at least one of the first lens face, the second lens face and the third lens face, an aspheric coefficient used to define the shape of the first effective area and an aspheric coefficient used to define the shape of the second effective area are different from each other.

3. The coupling lens according to claim 1, wherein in each of the first lens face, the second lens face and the third lens face, the first effective area and the second effective area are formed to have different aspheric shapes.

4. The coupling lens according to claim 1, wherein the first lens acts as a concave lens and the second lens acts as a convex lens.

5. The coupling lens according to claim 1, wherein the first lens and the second lens are cemented or bonded to each other.

6. The coupling lens according to claim 5, further comprising a holder for holding the first lens and the second lens in close contact with each other.

7. The coupling lens according to claim 1, wherein the first lens and the second lens are formed of different resin materials.

8. The coupling lens according to claim 1, wherein the first lens has an optical step.

9. The coupling lens according to claim 1, wherein one of the first lens and the second lens is formed of a glass material, and the other of the first lens and the second lens is formed of a resin material.

10. The coupling lens according to claim 7, wherein one of the first lens and the second lens is formed of an ultraviolet curable resin.

11. The coupling lens according to claim 7, wherein the resin materials have a glass transition temperature of 300° C. or lower.

12. The coupling lens according to claim 1, wherein the first lens and the second lens are formed of different glass materials.

13. The coupling lens according to claim 12, wherein a difference between the glass transition temperature of the glass material for the first lens and the glass transition temperature of the glass material for the second lens is 200° C. or greater.

14. An optical head, comprising:
a plurality of light sources for emitting laser light having different wavelengths;
an objective lens; and
a coupling lens according to claim 1, which is located on an optical path between the plurality of light sources and the objective lens;
wherein the laser light having different wavelengths is collected on an information recording layer of different types of optical information recording mediums respectively by the objective lens and the coupling lens.

15. The optical head according to claim 14, wherein the plurality of light sources include a first light source for emitting laser light having a wavelength $\lambda 1$, a second light source for emitting laser light having a wavelength $\lambda 2$, and a third and light source for emitting laser light having a wavelength $\lambda 3$, wherein the wavelengths $\lambda 1$, $\lambda 2$ and $\lambda 3$ fulfill:
350 nm<$\lambda 1$<450 nm,
600 nm<$\lambda 2$<700 nm, and
750 nm<$\lambda 3$<850 nm.

16. The optical head according to claim 14, wherein the coupling lens corrects a chromatic aberration of the objective lens which is caused by a change of the wavelength $\lambda 1$.

17. The optical head according to claim 16, wherein where an Abbe number represented using the refractive index of the first lens at d line (wavelength: 587.56 nm), F line (wavelength: 486.13 nm) and C line (wavelength: 656.27 nm) is vd1 and an Abbe number represented using the refractive index of the second lens at d line, F line and C line is vd2, the Abbe number vd1 and the Abbe number vd2 fulfill vd1<vd2.

18. The optical head according to claim 17, wherein the Abbe number vd1 and the Abbe number vd2 fulfill vd1<35 and vd2>50.

19. The optical head according to claim 14, further comprising a conversion section for converting the laser light into substantially parallel light, diverging light or converging light in accordance with the wavelength of the laser light and allowing the laser light to be incident on the objective lens.

20. The optical head according to claim 19, wherein the conversion section includes a collimator lens for allowing at least the laser light having the wavelength $\lambda 1$ to be incident on the objective lens as substantially parallel light, and a driving section for moving the collimator lens in an optical axis direction based on a driving signal corresponding to the wavelength of the laser light which is being emitted.

21. The optical head according to claim 20, wherein:
when the laser light having the wavelength $\lambda 1$ is collected on an optical recording medium, a spherical aberration is generated at a focal point of the laser light by the thickness of an optical transmissive layer of the optical recording medium; and
the conversion section moves the collimator lens in the optical axis direction and corrects the spherical aberration.

22. The optical head according to claim 14, further comprising an actuator having a movable section, physically connected with the objective lens, for changing the position of the objective lens,
wherein the coupling lens is fixed to the movable section of the actuator and moves integrally with the objective lens.

23. An optical drive, comprising:
an optical head according to claim 14;
a motor for driving an optical recording medium to be rotated; and
a control section for controlling the optical head and the motor.

24. The coupling lens according to claim 9, wherein one of the first lens and the second lens is formed of an ultraviolet curable resin.

* * * * *

UNITED STATES PATENT AND TRADEMARK OFFICE
CERTIFICATE OF CORRECTION

| | | |
|---|---|---|
| PATENT NO. | : 7,952,979 B2 | Page 1 of 1 |
| APPLICATION NO. | : 12/305784 | |
| DATED | : May 31, 2011 | |
| INVENTOR(S) | : Fumitomo Yamasaki et al. | |

It is certified that error appears in the above-identified patent and that said Letters Patent is hereby corrected as shown below:

Column 24, line 39, "and light source" should read --light source--.

Signed and Sealed this
Twenty-ninth Day of November, 2011

David J. Kappos
*Director of the United States Patent and Trademark Office*